US009563292B2

(12) United States Patent
Hamaguchi

(10) Patent No.: US 9,563,292 B2
(45) Date of Patent: Feb. 7, 2017

(54) STYLUS PEN, TOUCH PANEL SYSTEM AND ELECTRONIC DEVICE

(71) Applicant: SHARP KABUSHIKI KAISHA, Osaka-shi, Osaka (JP)

(72) Inventor: Mutsumi Hamaguchi, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

(21) Appl. No.: 14/784,544

(22) PCT Filed: Mar. 24, 2014

(86) PCT No.: PCT/JP2014/058052
§ 371 (c)(1),
(2) Date: Oct. 14, 2015

(87) PCT Pub. No.: WO2014/174960
PCT Pub. Date: Oct. 30, 2014

(65) Prior Publication Data
US 2016/0070373 A1    Mar. 10, 2016

(30) Foreign Application Priority Data

Apr. 22, 2013   (JP) .................. 2013-089821

(51) Int. Cl.
| G06F 3/044 | (2006.01) |
| G06F 3/0354 | (2013.01) |
| G06F 3/038 | (2013.01) |
| G06F 3/041 | (2006.01) |

(52) U.S. Cl.
CPC ......... *G06F 3/03545* (2013.01); *G06F 3/0383* (2013.01); *G06F 3/044* (2013.01); *G06F 3/0416* (2013.01)

(58) Field of Classification Search
None
See application file for complete search history.

(56) References Cited

U.S. PATENT DOCUMENTS

| 6,473,439 B1 | 10/2002 | Zerbe et al. |
| 2012/0013555 A1 | 1/2012 | Maeda et al. |
| 2012/0050207 A1 | 3/2012 | Westhues et al. |
| 2012/0182254 A1 | 7/2012 | Jang et al. |
| 2013/0169601 A1* | 7/2013 | Mo .................. G06F 3/038 345/179 |

FOREIGN PATENT DOCUMENTS

| JP | 2000-92691 A | 3/2000 |
| JP | 2001-520417 A | 10/2001 |
| JP | 2012-22543 A | 2/2012 |
| JP | 2012-150783 A | 8/2012 |
| WO | WO 99/19806 A1 | 4/1999 |

* cited by examiner

Primary Examiner — Seokyun Moon
(74) Attorney, Agent, or Firm — Birch, Stewart, Kolasch & Birch, LLP

(57) ABSTRACT

A stylus pen (15) includes a correction circuit that corrects difference between the number of controller clocks generated by a touch panel controller (2), which controls operation of a touch panel (3), for outputting a synchronization signal by the touch panel controller (2) and the number of pen clocks generated by the stylus pen (15) for receiving, by the stylus pen (15), the synchronization signal output from the touch panel controller (2).

4 Claims, 12 Drawing Sheets

15: STYLUS PEN

20: CORRECTION CIRCUIT
27: PEN MAIN BODY
28: GRIP PORTION
29: PEN TIP
30: PEN POINT COVER
31: PEN POINT AXIS
32: INSULATING BODY
34: CHANGEOVER SWITCH
35: GRIP PORTION TERMINAL
36: PEN POINT TERMINAL
37: GROUND TERMINAL
38: PEN POINT

FIG. 7

| N (THE NUMBER OF SYNCHRONIZATION SIGNALS) | Tcon [msec] | Nclk[N] (THE IDEAL NUMBER OF CLOCKS, Nclk[N]=Nclk×N) | Data[N] (THE NUMBER OF CLOCKS) ΔT≒200.02ppm | Data[N] ΔT≒-199.99ppm | DELTA[N] (DIFFERENCE BETWEEN THE ACTUAL NUMBER OF CLOCKS AND THE IDEAL NUMBER OF CLOCKS, DELTA[N]=Data[N]-Nclk[N]) ΔT≒200.02ppm | DELTA[N] ΔT≒-199.98ppm |
|---|---|---|---|---|---|---|
| 0 | 0 | 0 | 0 | 0 | | |
| 1 | 4 | 40,000 | 39,993 | 40,009 | -7 | 9 |
| 2 | 8 | 80,000 | 79,985 | 80,017 | -15 | 17 |
| 3 | 12 | 120,000 | 119,977 | 120,025 | -23 | 25 |
| 4 | 16 | 160,000 | 159,969 | 160,033 | -31 | 33 |
| 5 | 20 | 200,000 | 199,961 | 200,041 | -39 | 41 |
| 6 | 24 | 240,000 | 239,953 | 240,049 | -47 | 49 |
| 7 | 28 | 280,000 | 279,945 | 280,057 | -55 | 57 |
| 8 | 32 | 320,000 | 319,937 | 320,065 | -63 | 65 |
| 9 | 36 | 360,000 | 359,929 | 360,073 | -71 | 73 |
| 10 | 40 | 400,000 | 399,921 | 400,081 | -79 | 81 |
| 11 | 44 | 440,000 | 439,913 | 440,089 | -87 | 89 |
| 12 | 48 | 480,000 | 479,905 | 480,097 | -95 | 97 |
| 13 | 52 | 520,000 | 519,897 | 520,105 | -103 | 105 |
| 14 | 56 | 560,000 | 559,889 | 560,113 | -111 | 113 |
| 15 | 60 | 600,000 | 599,881 | 600,121 | -119 | 121 |
| 16 | 64 | 640,000 | 639,873 | 640,129 | -127 | 129 |
| 17 | 68 | 680,000 | 679,865 | 680,137 | -135 | 137 |
| 18 | 72 | 720,000 | 719,857 | 720,145 | -143 | 145 |
| 19 | 76 | 760,000 | 759,849 | 760,153 | -151 | 153 |
| 20 | 80 | 800,000 | 799,841 | 800,161 | -159 | 161 |
| 21 | 84 | 840,000 | 839,833 | 840,169 | -167 | 169 |
| 22 | 88 | 880,000 | 879,825 | 880,177 | -175 | 177 |
| 23 | 92 | 920,000 | 919,817 | 920,185 | -183 | 185 |
| 24 | 96 | 960,000 | 959,809 | 960,193 | -191 | 193 |
| 25 | 100 | 1,000,000 | 999,801 | 1,000,201 | -199 | 201 |
| 26 | 104 | 1,040,000 | 1,039,793 | 1,040,209 | -207 | 209 |
| 27 | 108 | 1,080,000 | 1,079,785 | 1,080,217 | -215 | 217 |
| 28 | 112 | 1,120,000 | 1,119,777 | 1,120,225 | -223 | 225 |
| 29 | 116 | 1,160,000 | 1,159,769 | 1,160,233 | -231 | 233 |
| 30 | 120 | 1,200,000 | 1,199,761 | 1,200,241 | -239 | 241 |
| 31 | 124 | 1,240,000 | 1,239,753 | 1,240,249 | -247 | 249 |
| 32 | 128 | 1,280,000 | 1,279,745 | 1,280,257 | -255 | 257 |
| 33 | 132 | 1,320,000 | 1,319,737 | 1,320,265 | -263 | 265 |
| 34 | 136 | 1,360,000 | 1,359,729 | 1,360,273 | -271 | 273 |
| 35 | 140 | 1,400,000 | 1,399,721 | 1,400,281 | -279 | 281 |
| 36 | 144 | 1,440,000 | 1,439,713 | 1,440,289 | -287 | 289 |
| 37 | 148 | 1,480,000 | 1,479,705 | 1,480,297 | -295 | 297 |
| 2496 | 9984 | 99,840,000 | 99,820,034 | 99,859,970 | -19,966 | 19,970 |
| 2497 | 9988 | 99,880,000 | 99,860,026 | 99,899,978 | -19,974 | 19,978 |
| 2498 | 9992 | 99,920,000 | 99,900,018 | 99,939,986 | -19,982 | 19,986 |
| 2499 | 9996 | 99,960,000 | 99,940,010 | 99,979,994 | -19,990 | 19,994 |
| 2500 | 10000 | 100,000,000 | 99,980,002 | 100,020,003 | -19,998 | 20,003 |
| 2501 | 10004 | 100,040,000 | 100,019,995 | 100,060,011 | -20,005 | 20,011 |

WHEN 0 ≤ N ≤ 2499, DELTA[N] < Nclk/2 IS ESTABLISHED AND DIFFERENCE BETWEEN CLOCKS IS ABLE TO BE CORRECTED.

FIG. 9

(a) Data_Relative[i,j]

|  | Data[0] | Data[1] | Data[2] | Data[3] |
|---|---|---|---|---|
| Data[0] | 5000 | 45004 | 85008 | 125012 |
| Data[1] | 5000 | 0 | -40004 | -80008 | -120012 |
| Data[2] | 45004 | 40004 | 0 | -40004 | -80008 |
| Data[3] | 85008 | 80008 | 40004 | 0 | -40004 |
| | 125012 | 120012 | 80008 | 40004 | 0 |

(b) $M2[i,j] = \text{round}\left(\dfrac{\text{Data\_Relative}[i,j]}{Nclk}\right)$

|  | Data[0] | Data[1] | Data[2] | Data[3] |
|---|---|---|---|---|
|  | 5000 | 45004 | 85008 | 125012 |
| Data[0] 5000 |  | -1 | -2 | -3 |
| Data[1] 45004 | 1 |  | -1 | -2 |
| Data[2] 85008 | 2 | 1 |  | -1 |
| Data[3] 125012 | 3 | 2 | 1 |  |

(c) $M3[i,j] = M2[i,j] \times Nclk$

|  | Data[0] | Data[1] | Data[2] | Data[3] |
|---|---|---|---|---|
|  | 5000 | 45004 | 85008 | 125012 |
| Data[0] 5000 |  | -40000 | -80000 | -120000 |
| Data[1] 45004 | 40000 |  | -40000 | -80000 |
| Data[2] 85008 | 80000 | 40000 |  | -40000 |
| Data[3] 125012 | 120000 | 80000 | 40000 |  |

(d) $M4[i,j] = \text{Data\_Relative}[i,j] - M3[i,j]$

|  | Data[0] | Data[1] | Data[2] | Data[3] |
|---|---|---|---|---|
|  | 5000 | 45004 | 85008 | 125012 |
| Data[0] 5000 |  | -4 | -8 | -12 |
| Data[1] 45004 | 4 |  | -4 | -8 |
| Data[2] 85008 | 8 | 4 |  | -4 |
| Data[3] 125012 | 12 | 8 | 4 |  |

(e) $\text{Verify}[i,j] = \dfrac{M4[i,j]}{M2[i,j]}$

|  | Data[0] | Data[1] | Data[2] | Data[3] |
|---|---|---|---|---|
|  | 5000 | 45004 | 85008 | 125012 |
| Data[0] 5000 |  | 4 | 4 | 4 |
| Data[1] 45004 | 4 |  | 4 | 4 |
| Data[2] 85008 | 4 | 4 |  | 4 |
| Data[3] 125012 | 4 | 4 | 4 |  |

(f) Valid[i,j]

|  | Data[0] | Data[1] | Data[2] | Data[3] |
|---|---|---|---|---|
|  | 5000 | 45004 | 85008 | 125012 |
| Data[0] 5000 |  | 4 | 4 | 4 |
| Data[1] 45004 | 4 |  | 4 | 4 |
| Data[2] 85008 | 4 | 4 |  | 4 |
| Data[3] 125012 | 4 | 4 | 4 |  |

IN A CASE OF |Verify[i,j]| < 10, DATA IS DETERMINED AS BEING VALID AND VALID DATA NUMBER IS CALCULATED.

| VALID DATA NUMBER | 3 | 3 | 3 | 3 |
|---|---|---|---|---|

FIG. 10

(a)
Data_Relative[ij]

|  | Data[0] | Data[1] | Data[2] | Data[3] | Data[4] | Data[5] |
|---|---|---|---|---|---|---|
|  | 5000 | 45004 | 55000 | 85008 | 95004 | 125012 |
| Data[0] | 5000 | 0 | -40004 | 55000 | -80008 | -90004 | -120012 |
| Data[1] | 45004 | -40004 | 0 | -9996 | -40004 | -50000 | -80008 |
| Data[2] | 55000 | 50000 | 9996 | 0 | -30008 | -40004 | -70012 |
| Data[3] | 85008 | 80008 | 40004 | 30008 | 0 | -9996 | -40004 |
| Data[4] | 95004 | 90004 | 50000 | 40004 | 9996 | 0 | -30008 |
| Data[5] | 125012 | 120012 | 80008 | 70012 | 40004 | 30008 | 0 |

(b)
$M2[ij] = \text{round}\left(\frac{\text{Data\_Relative}[ij]}{N_{clk}}\right)$

|  | Data[0] | Data[1] | Data[2] | Data[3] | Data[4] | Data[5] |
|---|---|---|---|---|---|---|
|  | 5000 | 45004 | 55000 | 85008 | 95004 | 125012 |
| Data[0] | 5000 |  | -1 | -1 | -2 | -2 | -3 |
| Data[1] | 45004 | -1 |  | 0 | -1 | -1 | -2 |
| Data[2] | 55000 | 1 | 0 |  | -1 | -1 | -2 |
| Data[3] | 85008 | 2 | 1 | 1 |  | 0 | -1 |
| Data[4] | 95004 | 2 | 1 | 1 | 0 |  | -1 |
| Data[5] | 125012 | 3 | 2 | 2 | 1 | 1 |  |

(c)
$M3[ij] = M2[ij] \times N_{clk}$

|  | Data[0] | Data[1] | Data[2] | Data[3] | Data[4] | Data[5] |
|---|---|---|---|---|---|---|
|  | 5000 | 45004 | 55000 | 85008 | 95004 | 125012 |
| Data[0] | 5000 |  | -40000 | -40000 | -80000 | -80000 | -120000 |
| Data[1] | 45004 | -40000 |  | 0 | -40000 | -40000 | -80000 |
| Data[2] | 55000 | 40000 | 0 |  | -40000 | -40000 | -80000 |
| Data[3] | 85008 | 80000 | 40000 | 40000 |  | 0 | -40000 |
| Data[4] | 95004 | 80000 | 40000 | 40000 | 0 |  | -40000 |
| Data[5] | 125012 | 120000 | 80000 | 80000 | 40000 | 40000 |  |

(d)
$M4[ij] = \text{Data\_Relative}[ij] - M3[ij]$

|  | Data[0] | Data[1] | Data[2] | Data[3] | Data[4] | Data[5] |
|---|---|---|---|---|---|---|
|  | 5000 | 45004 | 55000 | 85008 | 95004 | 125012 |
| Data[0] | 5000 |  | -4 | -10000 | -8 | -10004 | -12 |
| Data[1] | 45004 | 4 |  | -9996 | -4 | -10000 | -8 |
| Data[2] | 55000 | 10000 | 9996 |  | 9992 | -4 | 9988 |
| Data[3] | 85008 | 8 | 4 | -9992 |  | -9996 | -4 |
| Data[4] | 95004 | 10004 | 10000 | 4 | 9996 |  | 9992 |
| Data[5] | 125012 | 12 | 8 | -9988 | 4 | -9992 |  |

(e)
$\text{Verify}[ij] = \frac{M4[ij]}{M2[ij]}$

|  | Data[0] | Data[1] | Data[2] | Data[3] | Data[4] | Data[5] |
|---|---|---|---|---|---|---|
|  | 5000 | 45004 | 55000 | 85008 | 95004 | 125012 |
| Data[0] | 5000 |  | 4 | 10000 | 4 | 5002 | 4 |
| Data[1] | 45004 | 4 |  | 9996 | 4 | 10000 | 4 |
| Data[2] | 55000 | 10000 | 9996 |  | -9992 | 4 | -4994 |
| Data[3] | 85008 | 4 | 4 | -9992 |  | -9996 | 4 |
| Data[4] | 95004 | 5002 | 10000 | 4 | -9996 |  | -9992 |
| Data[5] | 125012 | 4 | 4 | -4994 | 4 | -9992 |  |

(f)
Valid[ij]

|  | Data[0] | Data[1] | Data[2] | Data[3] | Data[4] | Data[5] |
|---|---|---|---|---|---|---|
|  | 5000 | 45004 | 55000 | 85008 | 95004 | 125012 |
| Data[0] | 5000 |  | 4 |  |  |  |  |
| Data[1] | 45004 | 4 |  |  | 4 |  | 4 |
| Data[2] | 55000 |  |  |  |  |  |  |
| Data[3] | 85008 |  | 4 |  |  |  | 4 |
| Data[4] | 95004 |  |  | 4 |  |  |  |
| Data[5] | 125012 | 4 | 4 |  | 4 |  |  |

IN A CASE OF |Verify[ij]| < 10, DATA IS DETERMINED AS BEING VALID AND VALID DATA NUMBER IS CALCULATED.

| VALID DATA NUMBER | 3 | 3 | 1 | 3 | 1 | 3 |
|---|---|---|---|---|---|---|

STYLUS PEN, TOUCH PANEL SYSTEM AND ELECTRONIC DEVICE

TECHNICAL FIELD

The present invention relates to a stylus pen, and a touch panel system and an electronic device that include the stylus pen.

BACKGROUND ART

A touch panel system is widely used in various electronic devices such as a PC (personal computer), a mobile terminal and a tablet.

In the touch panel system, when a user causes his/her finger or a touch pen to be in contact with a touch panel, input operation to the touch panel is performed. In a touch panel system of an electrostatic capacitance method, change in an electrostatic capacitance in a touch panel, which is caused when a finger of a user or a touch pen is in contact with the touch panel, is detected, and a position at which the change in the electrostatic capacitance is caused in the touch panel is recognized as an input position to the touch panel.

In recent years, various stylus pens such as an active stylus pen have been developed as touch pens having a function of outputting a signal. It has been expected to further enhance performance of a touch panel system by applying the stylus pens to the touch panel system.

PTL 1 discloses a touch panel system that when input operations are performed by a plurality of stylus pens (electronic pens) to a touch panel, individual touch positions are able to be detected accurately.

CITATION LIST

Patent Literature

PTL 1: Japanese Unexamined Patent Application Publication No. 2012-22543 (Publication date: Feb. 2, 2012)

SUMMARY OF INVENTION

Technical Problem

The touch panel system disclosed in PTL 1 has a configuration corresponding to a touch panel system of a sequential driving method in which signal lines of the touch panel are successively selected for driving by a touch panel controller.

With the aforementioned touch panel system, in accordance with detection of a pen synchronization signal, which is transmitted by the touch panel controller, by each of the stylus pens, the stylus pen transmits the pen identification signal.

A technique has been focused on recently that drives a pen point of a stylus pen, which touches a touch panel having a plurality of electrostatic capacitances formed at respective intersections of a plurality of first signal lines and a plurality of second signal lines, to detect a position of the stylus pen on the touch panel.

Further, there is a desire to apply the technique to a touch panel controller of an electrostatic capacitance method for driving the aforementioned first signal lines and the aforementioned second signal lines alternately to enhance performance of the touch panel system.

A configuration in which a stylus pen and a touch panel controller are connected by cable and a pen point of the stylus pen is driven by cable with the touch panel controller is also considered, but from a viewpoint of operability, a configuration in which the pen point of the stylus pen is driven by radio is strongly requested. Therefore, considered is a configuration in which a synchronization circuit which synchronizes driving operation of the first and second signal lines of the touch panel controller and driving operation of the pen point of the stylus pen, and a driving circuit which drives the pen point of the stylus pen are provided in the stylus pen.

However, there is actually a problem that the aforementioned synchronization between the driving operation of the first and second signal lines of the touch panel controller and the driving operation of the pen point of the stylus pen is lost due to a difference between a period of a clock signal of the touch panel controller and a period of a clock signal of the stylus pen.

PTL 1 above does not teach nor suggest a configuration for correcting the loss of the synchronization between the driving operation of the first and second signal lines of the touch panel controller and the driving operation of the pen point of the stylus pen due to the difference between the period of the clock signal of the touch panel controller and the period of the clock signal of the stylus pen.

The invention has been made to solve the aforementioned problem and an object thereof is to provide a stylus pen capable of correcting the loss of the synchronization between the driving operation of the first and second signal lines of the touch panel controller and the driving operation of the pen point of the stylus pen.

Solution to Problem

In order to solve the aforementioned problem, a stylus pen according to one aspect of the invention is a stylus pen which performs touch input to a touch panel, including a correction circuit that corrects difference between the number of controller clocks generated by a touch panel controller for controlling operation of the touch panel to output a synchronization signal by the touch panel controller and the number of pen clocks generated by the stylus pen to receive the synchronization signal, which is output from the touch panel controller, by the stylus pen.

Advantageous Effects of Invention

With the stylus pen according to one aspect of the invention, an effect is exerted that the loss of the synchronization between the driving operation of the first and second signal lines of the touch panel controller and the driving operation of the pen point of the stylus pen is corrected.

BRIEF DESCRIPTION OF DRAWINGS

FIG. 7 is a view illustrating a correlation between synchronization signals and clock signals in the touch panel controller and the stylus pen according to the embodiment 1 of the invention.

FIG. 9 is a view illustrating one example of components of each matrix when there is no erroneous detection of data of the number of clocks in the touch panel system according to the embodiment 1 of the invention.

FIG. 10 is a view illustrating one example of components of each matrix when there is erroneous detection of data of the number of clocks in the touch panel system according to the embodiment 1 of the invention.

DESCRIPTION OF EMBODIMENTS

Embodiment 1

An embodiment 1 of the invention will be described based on FIG. 1 to FIG. 11 as follows.

(Configuration of Touch Panel System 1)

Figure 1:
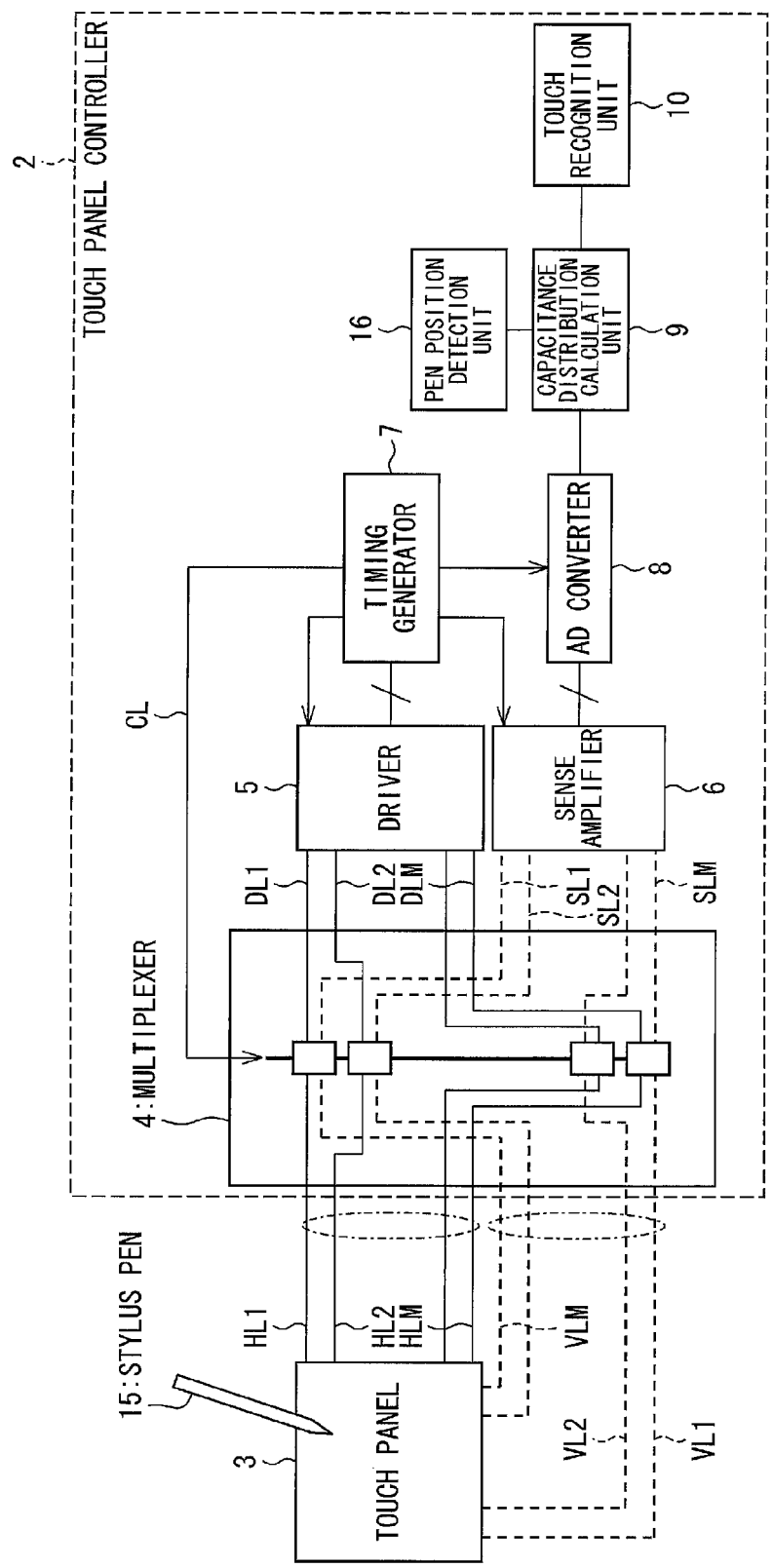
FIG. 1 is a functional block diagram illustrating a schematic configuration of a touch panel system according to an embodiment 1 of the invention.

FIG. 1 is a functional block diagram illustrating a schematic configuration of a touch panel system 1 according to the present embodiment. The touch panel system 1 includes a touch panel controller 2, a touch panel 3 and a stylus pen 15.

(Touch Panel 3)

Figure 2:
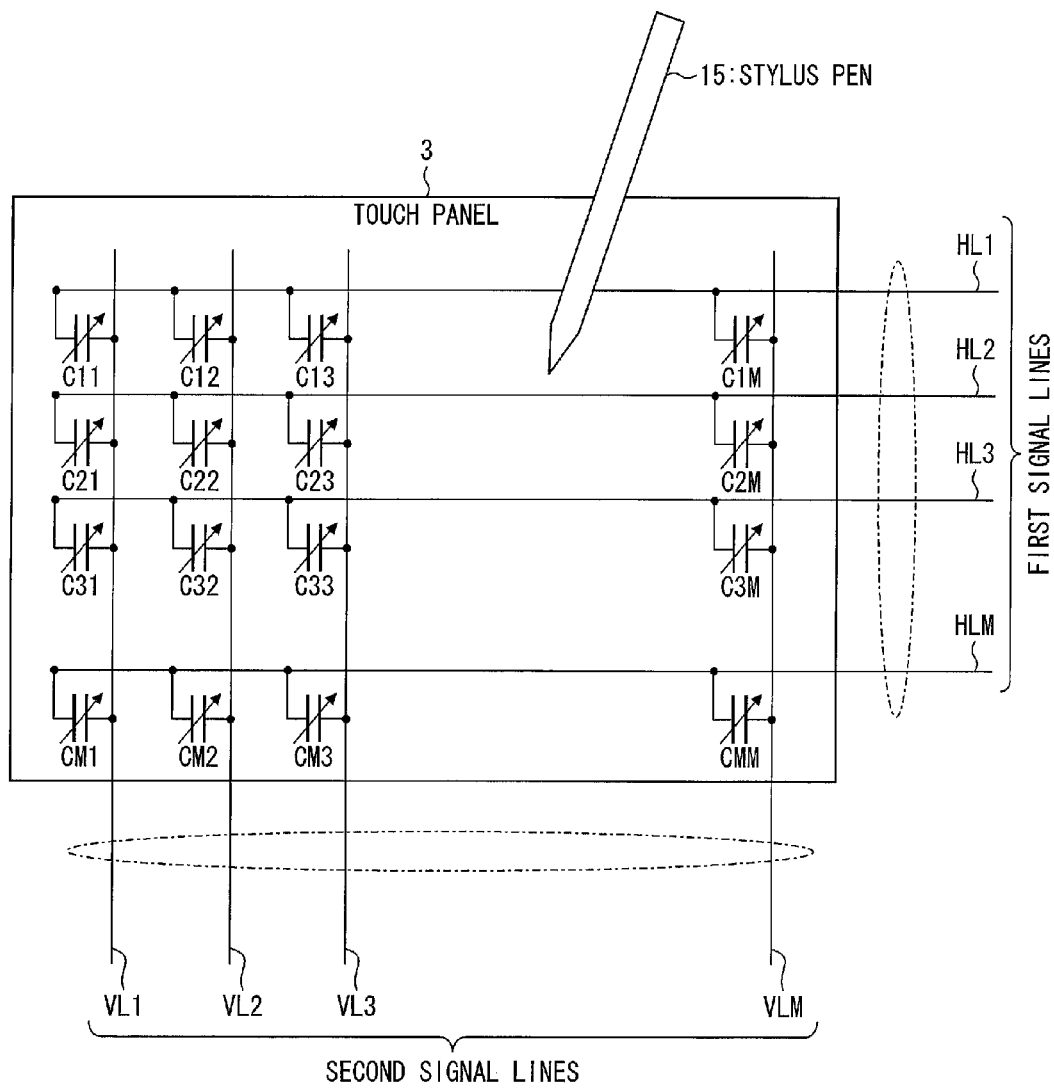
FIG. 2 is a view schematically illustrating a configuration of a touch panel according to the embodiment 1 of the invention.

FIG. 2 is a view schematically illustrating a configuration of the touch panel 3. The touch panel 3 includes M (M is a natural number) first signal lines HL1 to HLM which are arranged in parallel to each other along a horizontal direction and M second signal lines VL1 to VLM which are arranged in parallel to each other along a vertical direction. The natural number M here indicates the number of signal lines in the touch panel system 1, and is different from a non-negative integer M indicating a number of a synchronization signal described below.

In the touch panel 3, (M×M) electrostatic capacitances C11 to CMM are formed at intersections of the signal lines HL1 to HLM and the signal lines VL1 to VLM, respectively.

The touch panel 3 preferably has an area which is large to some extent so as to allow a user to put his/her hand gripping the stylus pen 15 thereon, but may have a small area so as to be applied to a small mobile terminal such as a smartphone.

(Touch Panel Controller 2)

As illustrated in FIG. 1, the touch panel controller 2 includes a multiplexer 4, a driver 5, a sense amplifier 6, a timing generator 7, an AD (Analog-Digital) converter 8, a capacitance distribution calculation unit 9, a touch recognition unit 10 and a pen position detection unit 16. Each member included in the touch panel controller 2 will be described below.

(Multiplexer 4)

Figure 3:
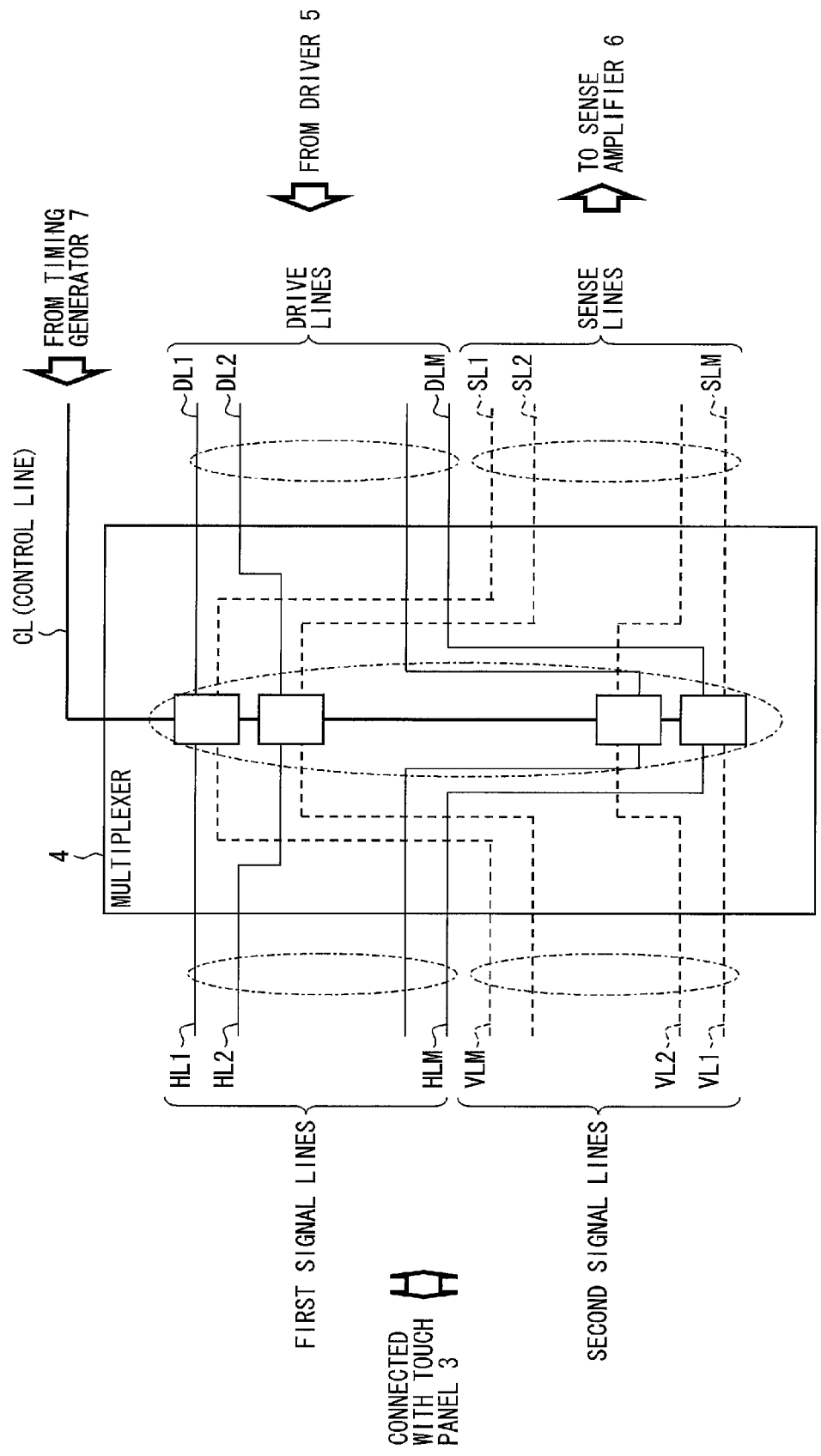
FIG. 3 is a view illustrating connection relations of wiring in a multiplexer according to the embodiment 1 of the invention.

FIG. 3 is a view illustrating connection relations of wiring in the multiplexer 4, and illustrates each connection relation in (i) the first signal lines HL1 to HLM connected to the touch panel 3, (ii) the second signal lines VL1 to VLM connected to the touch panel 3, (iii) drive lines DL1 to DLM connected to the driver 5, and (iv) sense lines SL1 to SLM connected to the sense amplifier 6.

The multiplexer 4 switches two connection states of a first connection state and a second connection state. A control signal for controlling switching operation of the multiplexer 4 is supplied from the timing generator 7 to the multiplexer 4 through a control line CL.

Here, the first connection state refers to a state where the first signal lines HL1 to HLM of the touch panel 3 are connected to the drive lines DL1 to DLM of the driver 5 and the second signal lines VL1 to VLM of the touch panel 3 are connected to the sense lines SL1 to SLM of the sense amplifier 6.

The second connection state refers to a state where the first signal lines HL1 to HLM of the touch panel 3 are connected to the sense lines SL1 to SLM of the sense amplifier 6 and the second signal lines VL1 to VLM of the touch panel 3 are connected to the drive lines DL1 to DLM of the driver 5.

Figure 4:
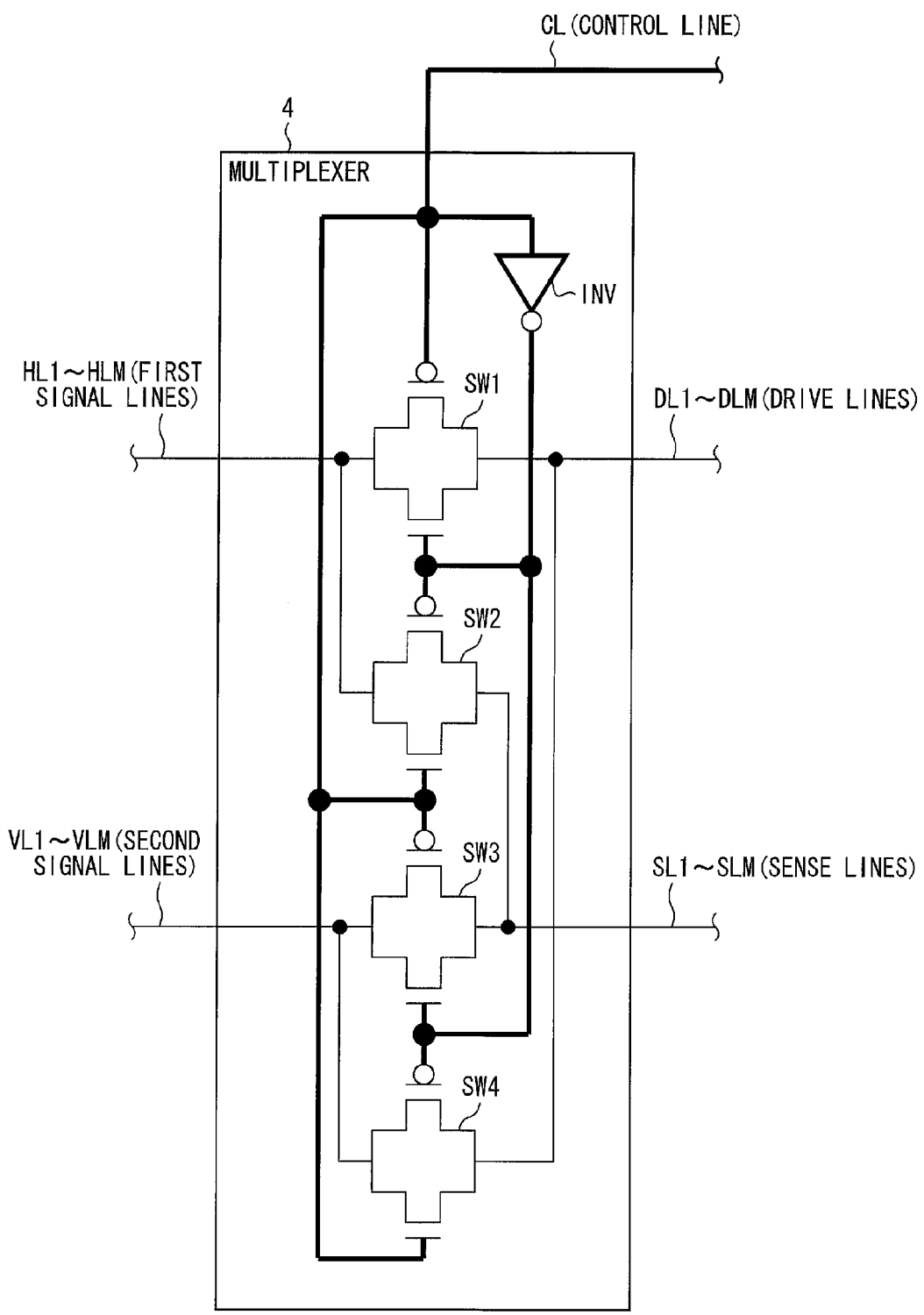
FIG. 4 is a view illustrating a circuit configuration of the multiplexer according to the embodiment 1 of the invention.

FIG. 4 is a view illustrating a circuit configuration of the multiplexer 4. The multiplexer 4 includes switches SW1 to SW4 and an inverter INV.

Each of the switches SW1 to SW4 is a CMOS (Complementary MOS) gate circuit which is formed by combining a PMOS (Positive Metal Oxide Semiconductor) and an NMOS (Negative MOS). The inverter INV is a NOT element having one input and one output in a logic circuit, and has a function of reversing a logic value (for example, 0) of a logic variable given to an input side and outputting the reversed logic value (for example, 1) to an output side.

The control line CL from the timing generator 7 is connected to input sides of (i) a gate of the PMOS of the switch SW1, (ii) a gate of the NMOS of the switch SW2, (iii) a gate of the PMOS of the switch SW3, (iv) a gate of the NMOS of the switch SW4 and (v) the inverter INV.

The output side of the inverter INV is connected to (i) a gate of the NMOS of the switch SW1, (ii) a gate of the PMOS of the switch SW2, (iii) a gate of the NMOS of SW3 and (iv) a gate of the PMOS of the switch SW4.

The first signal lines HL1 to HLM are connected to the switches SW1 and SW2. The second signal lines VL1 to VLM are connected to the switches SW3 and SW4. Further, the drive lines DL1 to DLM are connected to the switches SW1 and SW4. The sense lines SL1 to SLM are connected to the switches SW2 and SW3.

When a logic value of a control signal given from the timing generator 7 to the multiplexer 4 through the control line CL is a LOW value (for example, 0), the first signal lines HL1 to HLM are connected to the drive lines DL1 to DLM and the second signal lines VL1 to VLM are connected to the sense lines SL1 to SLM. That is, the first connection state is achieved by the multiplexer 4.

On the other hand, when the logic value of the control signal given from the timing generator 7 to the multiplexer 4 through the control line CL is a HIGH value (for example, 1), the first signal lines HL1 to HLM are connected to the sense lines SL1 to SLM and the second signal lines VL1 to VLM are connected to the drive lines DL1 to DLM. That is, the second connection state is achieved by the multiplexer 4.

(Driver 5)

The driver 5 applies voltage to the drive lines DL1 to DLM based on M coded sequences among (M+1) coded sequences having a length N and drives the drive lines DL1 to DLM.

Moreover, the driver 5 applies voltage to the stylus pen 15 connected by cable based on the remaining one coded sequence among the (M+1) coded sequences described above and drives the stylus pen 15.

That is, the driver 5 is a driver corresponding to a touch panel system of a parallel driving method, which drives the drive lines DL1 to DLM and the stylus pen 15 in a parallel manner.

Figure 5:
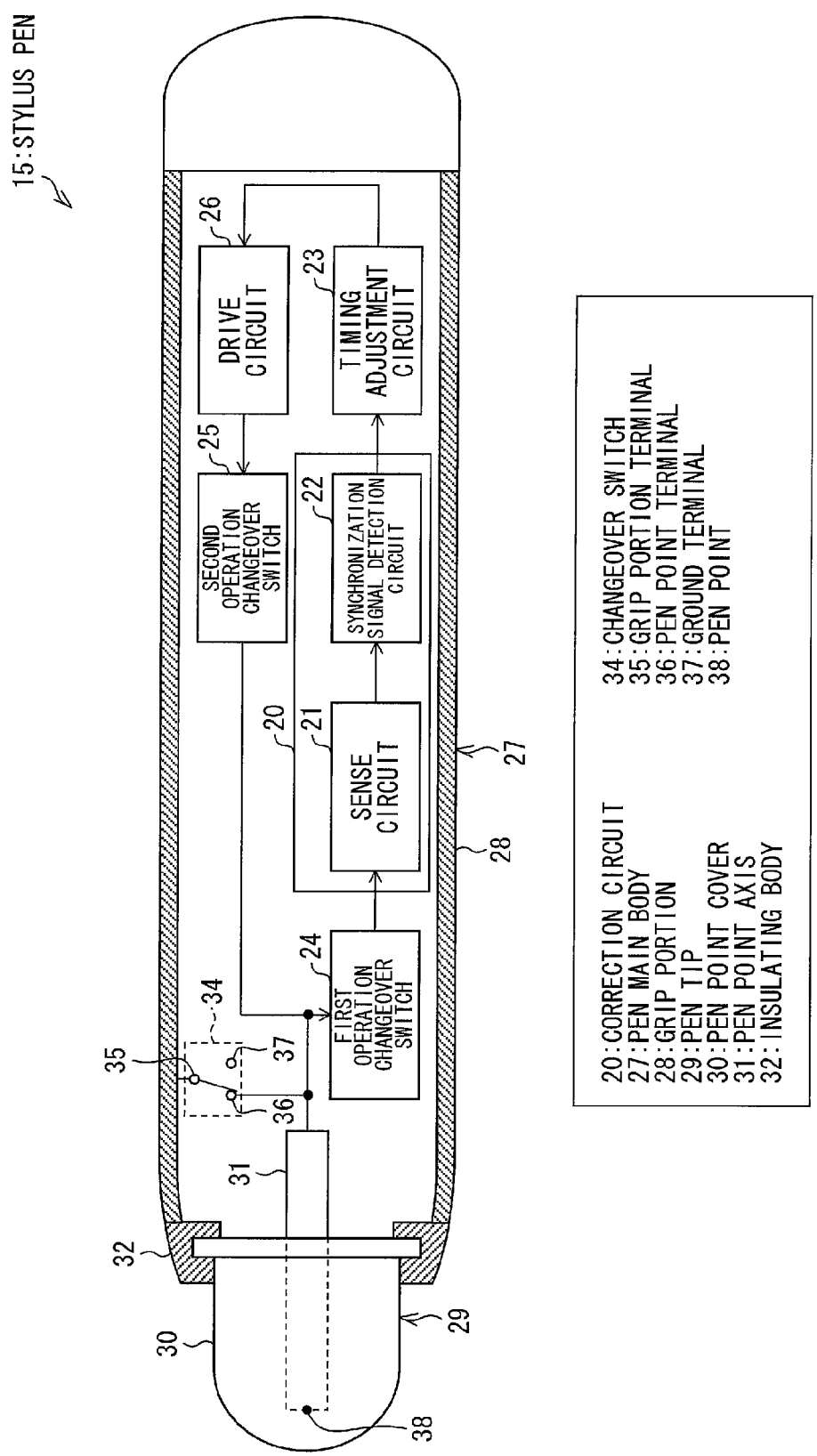
FIG. 5 is a functional block diagram schematically illustrating a configuration of a stylus pen according to the embodiment 1 of the invention.

Note that, the present embodiment employs a configuration in which a sense circuit, a synchronization signal detection circuit and a drive circuit are mounted in the stylus pen 15 as illustrated in FIG. 5 described below for driving the stylus pen 15.

In addition, the driver 5 drives the touch panel 3 with a synchronization signal. The stylus pen 15 obtains the synchronization signal from the touch panel 3 with the sense circuit. That is, it may be regarded that the synchronization signal is supplied from the touch panel controller 2 to the stylus pen 15.

With the drive circuit included in the stylus pen 15, the stylus pen 15 is driven based on the synchronization signal output by the touch panel controller 2.

(Sense Amplifier 6)

The sense amplifier 6 reads a first linear sum signal which is a signal indicating a linear sum of
  (i) charges corresponding to the respective electrostatic capacitances C11 to CMM, and
  (ii) charges corresponding to electrostatic capacitances between the stylus pen 15 and the respective M second signal lines VL1 to VLM,
as an analog signal from the sense lines SL1 to SLM.

The sense amplifier 6 then supplies the first linear sum signal as the analog signal to the AD converter 8.

Moreover, the sense amplifier 6 reads a second linear sum signal indicating a linear sum of
  (i) charges corresponding to the respective electrostatic capacitances C11 to CMM, and
  (ii) charges corresponding to electrostatic capacitances between the stylus pen 15 and the respective M first signal lines HL1 to HLM,
as an analog signal from the sense lines SL1 to SLM.

The sense amplifier 6 then supplies the second linear sum signal as the analog signal to the AD converter 8.

(AD Converter 8)

The AD converter 8 applies AD conversion to the first linear sum signal as the analog signal, which is received from the sense amplifier 6, and supplies the digitized first linear sum signal to the capacitance distribution calculation unit 9.

The AD converter 8 applies AD conversion to the second linear sum signal as the analog signal, which is received from the sense amplifier 6, and supplies the digitized second linear sum signal to the capacitance distribution calculation unit 9.

By supplying the first linear sum signal and the second linear sum signal as the digital signals from the AD converter 8 to the capacitance distribution calculation unit 9, various operations for calculating distribution of the electrostatic capacitances in the touch panel 3 by the capacitance distribution calculation unit 9 is facilitated.

(Capacitance Distribution Calculation Unit 9)

The capacitance distribution calculation unit 9 calculates, based on the first linear sum signal, the second linear sum signal and the (M+1) coded sequences having the length N, which are described above,
  (i) a first electrostatic capacitance map indicating distribution of the electrostatic capacitances in the touch panel 3,
  (ii) a second electrostatic capacitance map indicating distribution of the electrostatic capacitances between the stylus pen 15 and the respective first signal lines HL1 to HLM, and
  (iii) a third electrostatic capacitance map indicating distribution of the electrostatic capacitances between the stylus pen 15 and the respective second signal lines VL1 to VLM.

The capacitance distribution calculation unit 9 supplies the first electrostatic capacitance map to the touch recognition unit 10, and supplies the second electrostatic capacitance map and the third electrostatic capacitance map to the pen position detection unit 16.

(Touch Recognition Unit 10)

Based on the first electrostatic capacitance map received from the capacitance distribution calculation unit 9, the touch recognition unit 10 detects a position at which touch input is performed on the touch panel 3.

(Pen Position Detection Unit 16)

The pen position detection unit 16 detects a position of the stylus pen 15 along the second signal lines VL1 to VLM of the touch panel 3 based on the second electrostatic capacitance map received from the capacitance distribution calculation unit 9.

Further, the pen position detection unit 16 detects the position of the stylus pen 15 along the first signal lines HL1 to HLM of the touch panel 3 based on the third electrostatic capacitance map received from the capacitance distribution calculation unit 9.

(Timing Generator 7)

The timing generator 7 generates control signals for defining respective operations of the multiplexer 4, the driver 5, the sense amplifier 6 and the AD converter 8 and supplies the control signals to the driver 5, the sense amplifier 6 and the AD converter 8, respectively.

(Stylus Pen 15)

The stylus pen 15 is a touch pen which is gripped by a hand of a user for performing touch input to the touch panel 3. The stylus pen 15 may be driven by cable or may be driven by radio. Described here is a configuration in which the stylus pen 15 is driven by radio and operates in synchronization with the touch panel controller 2.

FIG. 5 is a functional block diagram schematically illustrating the configuration of the stylus pen 15. The stylus pen 15 includes a pen main body 27 having a conductive grip portion 28 formed in a substantially cylindrical shape, which is provided for the user to grip the stylus pen 15 with his/her hand, and a pen tip 29 which is pushed against the touch panel 3 in operation of touch input by the user.

The pen tip 29 has a pen point cover 30 and a pen point axis 31. The pen point axis 31 has a pen point 38 at a tip thereof. The pen point cover 30 is formed with a conductive felt material and the pen point axis 31 is formed with a conductive synthetic resin.

The pen tip 29 is held by the pen main body 27 through an insulating body 32. The pen point axis 31 is supported by a not-shown guide member so as to be movable in an axis direction (that is, a longitudinal direction of the stylus pen 15).

In operation of touch input by the user, the pen tip 29 is pressed against the touch panel 3. At this time, the pen point cover 30 formed with the felt material is depressed and the pen point axis 31 is pressed into an inside of the stylus pen 15 by the touch panel 3.

The stylus pen 15 is provided with a changeover switch 34. The changeover switch 34 has a grip portion terminal 35 connected to the grip portion 28, a pen point terminal 36 connected to the pen point 38, and a ground terminal 37 having a ground potential. The changeover switch 34 is a switch for switching a terminal of a connection destination of the grip portion terminal 35 to either the pen point terminal 36 or the ground terminal 37.

Further, the stylus pen 15 includes a correction circuit 20, a timing adjustment circuit 23, a first operation changeover switch 24, a second operation changeover switch 25, and a drive circuit 26. The correction circuit 20 includes a sense circuit 21 and a synchronization signal detection circuit 22.

The stylus pen 15 has two operation modes of (i) a sense mode for detecting a synchronization signal from the touch panel controller 2 and (ii) a drive mode for driving the stylus pen 15.

(Sense Mode)

In the sense mode, the first operation changeover switch 24 becomes in an on state and the pen point 38 and the sense circuit 21 are connected. Additionally, the second operation changeover switch 25 becomes in an off state and the pen point 38 and the drive circuit 26 become in a state of not being connected.

The sense circuit 21 obtains the synchronization signal transmitted from the driver 5 of the touch panel controller 2 through the touch panel 3. The sense circuit 21 then supplies the synchronization signal from the touch panel controller 2, which is obtained through the pen point 38 and the first operation changeover switch 24, to the synchronization signal detection circuit 22.

Moreover, the sense circuit 21 detects data indicating a number of a clock signal of the stylus pen 15 (the number of clocks Data[N] described below), which corresponds to the synchronization signal from the touch panel controller 2, and supplies the data to the synchronization signal detection circuit 22.

The synchronization signal detection circuit 22 executes various operations based on the synchronization signal from the touch panel controller 2, which is received from the sense circuit 21, and the data indicating a number of the clock signal of the stylus pen, which corresponds to the synchronization signal from the touch panel controller 2, and generates a timing correction signal which is a control signal for operating the stylus pen 15 in synchronization with the touch panel controller 2.

Here, a configuration for generating the timing correction signal in the synchronization signal detection circuit 22 will be described below in detail (refer to FIG. 11 described below).

Note that, the stylus pen 15 continues operation in the sense mode and does not shift to operation in the drive mode until becoming capable of operating in synchronization with the touch panel controller 2.

Here, various parameters used for operating the synchronization signal detection circuit 22, which include a value of a time period at which the synchronization signal is supplied from the touch panel controller 2 to the stylus pen 15 (that is, a value of time $T_{CON}$ described below) are able to be initialized in the stylus pen 15.

Accordingly, it may be configured so that by mounting a non-volatile memory in the stylus pen 15, initial setting is stored in the stylus pen 15 also when a power of the stylus pen 15 is made in an off state.

When a non-volatile memory is not mounted in the stylus pen 15, it may be configured so that immediately after the power of the stylus pen 15 is made in an on state and the stylus pen 15 is activated, the stylus pen 15 is connected to the touch panel controller 2 by cable and initial setting is written in a volatile memory (not shown) included in the stylus pen 15.

(Drive Mode)

In the drive mode, the second operation changeover switch 25 is made in an on state and the pen point 38 and the drive circuit 26 are connected. Additionally, the first operation changeover switch 24 becomes in an off state and the pen point 38 and the sense circuit 21 become in a state of not being connected.

The synchronization signal detection circuit 22 supplies the timing correction signal generated in a synchronization mode to the timing adjustment circuit 23.

The timing adjustment circuit 23 defines based on the timing correction signal supplied from the synchronization signal detection circuit 22 a timing of operation of the drive circuit 26 so that the stylus pen 15 operates in synchronization with an operation clock output by the touch panel controller 2.

The drive circuit 26 supplies a drive signal generated at the timing of the operation, which is defined by the timing adjustment circuit 23, to the pen point 38 through the second operation changeover switch 25.

(Shift of Timing of Synchronization Signal)

Figure 6:
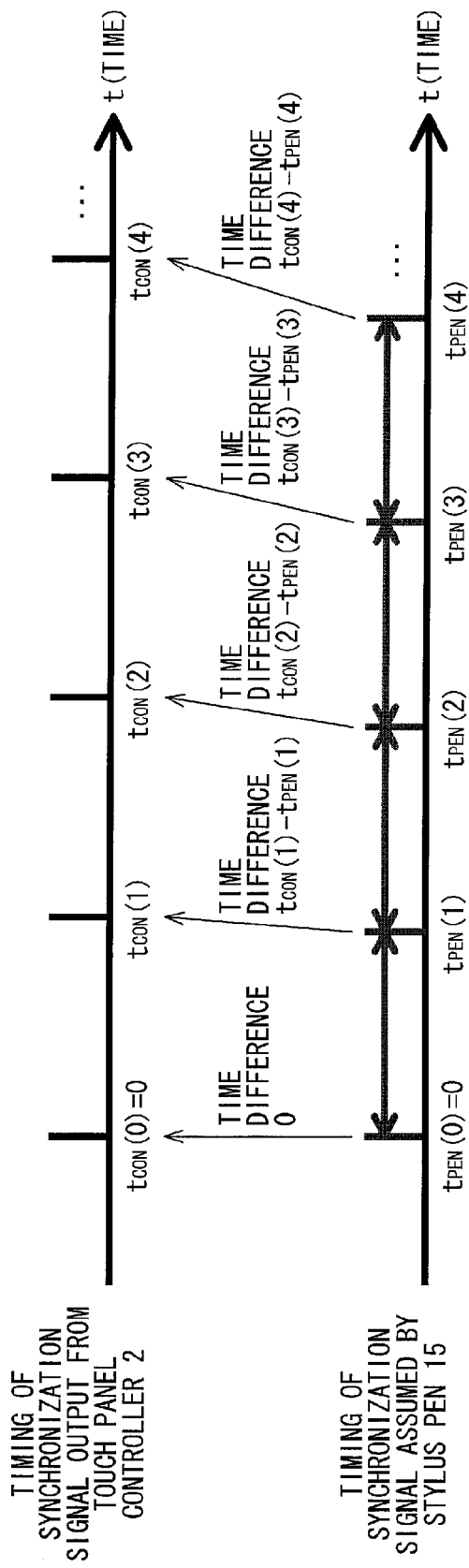
FIG. 6 is a view illustrating timings of synchronization signals in a touch panel controller and the stylus pen according to the embodiment 1 of the invention.

Next, shift of timing of the synchronization signal between the touch panel controller 2 and the stylus pen 15 will be described based on FIG. 6. FIG. 6 is a view illustrating a relation between a timing at which the touch panel controller 2 outputs the synchronization signal to the stylus pen 15 and a timing assumed by the stylus pen 15 that the synchronization signal is supplied from the touch panel controller 2.

Considered here is a case where the synchronization signal is supplied from the touch panel controller 2 to the stylus pen 15 at a time t=0.

After obtaining the synchronization signal from the touch panel controller 2 at a time $t_{PEN}(0)=0$, based on a parameter value of the time period at which the synchronization signal is supplied from the touch panel controller 2 to the stylus pen 15, which is indicated in the initial setting, the stylus pen 15 assumes a timing at which a subsequent synchronization signal is received from the touch panel controller 2 according to a period $T_{PEN}$ of its own clock signal.

That is, the stylus pen 15 assumes that synchronization signals are supplied from the touch panel controller 2 at times $t_{PEN}(1)$, $t_{PEN}(2)$, $t_{PEN}(3)$ and $t_{PEN}(4)$ subsequent to the time $t_{PEN}(0)=0$.

Further, times at which the touch panel controller 2 outputs the respective synchronization signals to the stylus pen 15 are represented as times $t_{CON}(1)$, $t_{CON}(2)$, $t_{CON}(3)$ and $t_{CON}(4)$ subsequent to the time $t_{CON}(0)=0$. Note that, the time t=0 is a reference time of a timing of a synchronization signal and $t_{CON}(0)=t_{PEN}(0)=0$ is established.

In an ideal case, $t_{CON}(1)=t_{PEN}(1)$, $t_{CON}(2)=t_{PEN}(2)$, $t_{CON}(3)=t_{PEN}(3)$, and $t_{CON}(4)=t_{PEN}(4)$ are established. That is, both of the timing at which the touch panel controller 2 outputs the synchronization signal to the stylus pen 15 and the timing assumed by the stylus pen 15 that the synchronization signal is supplied from the touch panel controller 2 are matched.

However, the ideal relations described above are not actually established, $t_{CON}(1) \ne t_{PEN}(1)$, $t_{CON}(2) \ne t_{PEN}(2)$, $t_{CON}(3) \ne t_{PEN}(3)$, and $t_{CON}(4) \ne t_{PEN}(4)$ are generally provided as illustrated in FIG. 6.

Note that, exemplified in FIG. 6 is a case where $t_{CON}(i) > t_{PEN}(i)$ ($1 \le i \le 4$) is provided and the timing assumed by the stylus pen 15 that the synchronization signal is supplied from the touch panel controller 2 is earlier than the timing at which the touch panel controller 2 outputs the synchronization signal to the stylus pen 15.

Such shift of the timing of the synchronization signal is derived from deviation of the periods of the respective clock signals in the touch panel controller 2 and the stylus pen 15.

That is, both of the clock signal of the touch panel controller 2 and the clock signal of the stylus pen 15 are designed to have the same period of a clock signal and each of them is generated by a crystal oscillator.

However, due to deviation of individual crystal oscillators (for example, manufacturing tolerances), each of the period of the clock signal of the touch panel controller 2 and the period of the clock signal of the stylus pen 15 includes deviation from a design value. Therefore, the period of the clock signal of the touch panel controller 2 and the period of the clock signal of the stylus pen 15 are different from each other, resulting that the shift of the timing of the synchronization signal is caused between the touch panel controller 2 and the stylus pen 15.

(Deviation of Clocks of Touch Panel Controller 2 and Stylus Pen 15)

Next, the deviation of the clocks of the touch panel controller 2 and the stylus pen 5 will be described.

Here, the deviation of the clock period of the stylus pen 15 is represented as $\Delta T_{PEN}$. $\Delta T_{PEN}$ is an amount defined by the deviation of the crystal oscillator contained in the stylus pen 15.

An ideal value of a time period until a next synchronization signal is supplied from the touch panel controller 2 to the stylus pen 15 after one synchronization signal is given is represented as $T_{IDEAL}$. Further, a value which is assumed by the stylus pen 15 as a time period until the next synchronization signal is supplied from the touch panel controller 2 after one synchronization signal is given is represented as $T_{PEN}$.

At this time, $\Delta T_{PEN}$ is represented by a following formula (1) by using $T_{PEN}$ and $T_{IDEAL}$.

$$\Delta T_{PEN} = (T_{PEN} - T_{IDEAL})/T_{IDEAL} \quad (1)$$

Moreover, by modifying the formula (1), $\Delta T_{PEN}$ is represented by a following formula (2) by using $\Delta T_{PEN}$ and $T_{IDEAL}$.

$$T_{PEN} = T_{IDEAL} \times (1 + \Delta T_{PEN}) \quad (2)$$

Next, the deviation of the clock period of the touch panel controller 2 is represented as $\Delta T_{CON}$. $\Delta T_{CON}$ is an amount defined by the deviation of the crystal oscillator contained in the touch panel controller 2.

Here, relative to $T_{IDEAL}$ described above, a time period until the touch panel controller 2 supplies the next synchronization signal to the stylus pen 15 after supplying one synchronization signal is represented as $T_{CON}$.

At this time, $\Delta T_{CON}$ is represented by a following formula (3) by using $T_{CON}$ and $T_{IDEAL}$.

$$\Delta T_{CON} = (T_{CON} - T_{IDEAL})/T_{IDEAL} \quad (3)$$

Moreover, by modifying the formula (3), $\Delta T_{CON}$ is represented by a following formula (4) by using $\Delta T_{CON}$ and $T_{IDEAL}$.

$$T_{CON} = T_{IDEAL} \times (1 + \Delta T_{CON}) \quad (4)$$

Furthermore, the deviation of the clock period of the stylus pen 15 with respect to the touch panel controller 2, which is observed with the stylus pen 15 as a reference, is represented as $\Delta T$. At this time, $\Delta T$ is represented by a following formula (5) by using $T_{PEN}$ and $T_{CON}$.

$$\Delta T = (T_{PEN} - T_{CON})/T_{CON} \quad (5)$$
$$= T_{PEN}/T_{CON} - 1$$

By applying the formula (2) and the formula (4) to the formula (5), $\Delta T$ is represented also by a following formula (6) by using $\Delta T_{PEN}$ and $\Delta T_{CON}$.

$$\Delta T = (T_{IDEAL} \times (1 + \Delta T_{PEN}))/(T_{IDEAL} \times (1 + \Delta T_{CON})) - 1 \quad (6)$$
$$= (1 + \Delta T_{PEN})/(1 + \Delta T_{CON}) - 1$$

is provided.

Note that, deviation of a clock period is about $\pm 100$ ppm ($=\pm 0.01\%$) in an electronic device including a general crystal oscillator. Accordingly, when $\Delta T_{PEN} = \Delta T_{CON} = \pm 100$ ppm is set, $\Delta T$ has a value almost in a range from (i) $\Delta T \approx -199.98$ ppm to (ii) $\Delta T \approx 200.02$ ppm according to the formula (6). That is, $\Delta T \approx \pm 200$ ppm.

(Condition for Allowing Correction of Difference in Clock Signals)

Figure 8:
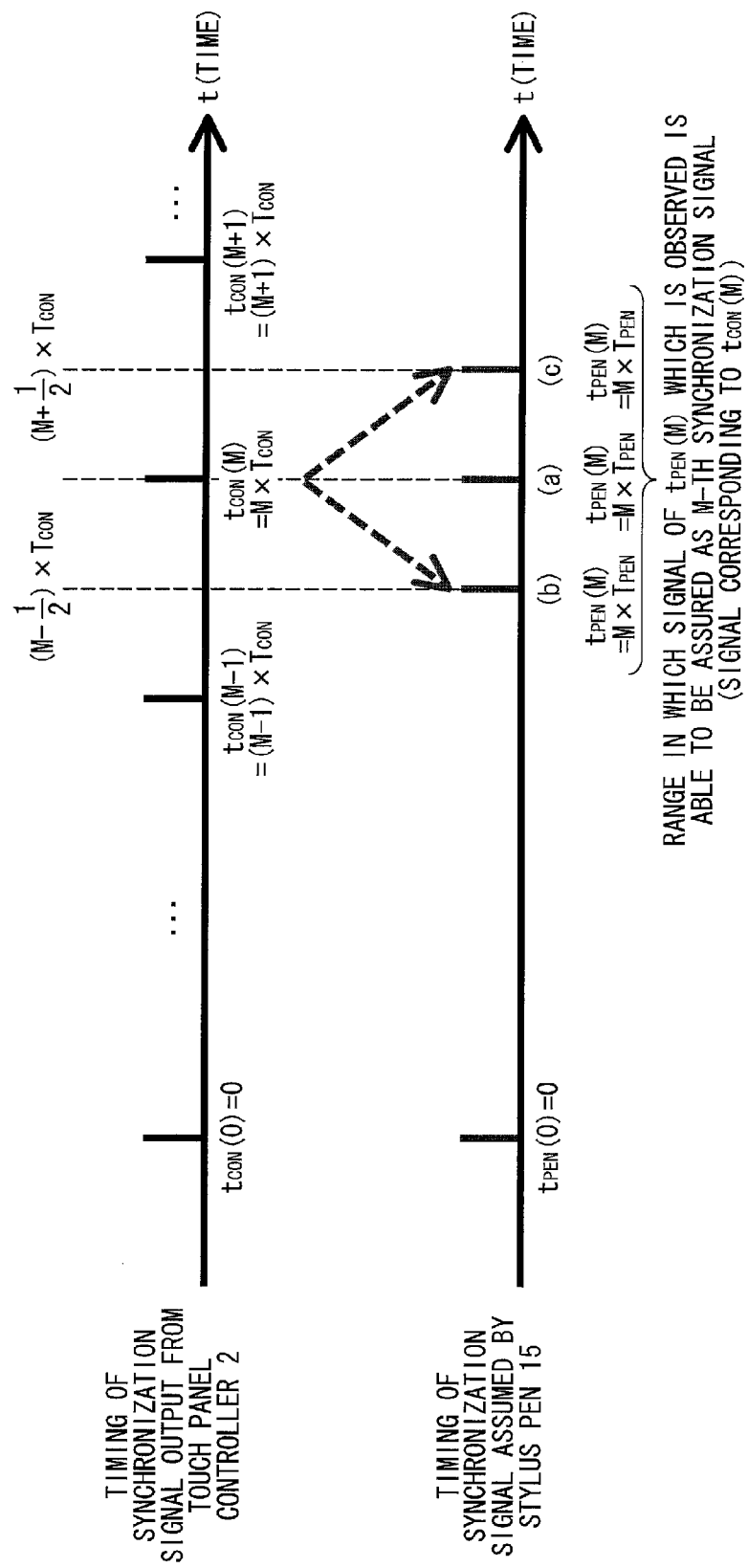
FIG. 8 is a view illustrating timings of synchronization signals in the touch panel controller and the stylus pen according to the embodiment 1 of the invention.

Next, description will be given for a condition for allowing correction of difference in the clock signals between the touch panel controller 2 and the stylus pen 15 based on FIG. 7 and FIG. 8. FIG. 7 is a view (table) illustrating a correlation between synchronization signals and clock signals in the touch panel controller 2 and the stylus pen 15. FIG. 8 is a view illustrating a relation between a timing at which the touch panel controller 2 outputs the synchronization signal to the stylus pen 15 and a timing assumed by the stylus pen 15 that the synchronization signal is supplied from the touch panel controller 2.

Here, in FIG. 7, the number of synchronization signals supplied from the touch panel controller 2 to the stylus pen 15 is represented as a non-negative integer N and a range of $0 \le N \le 2501$ is considered.

Moreover, $T_{CON}$ which is the time period until the touch panel controller 2 supplies a next synchronization signal to the stylus pen 15 after supplying one synchronization signal is employed as a reference of time and $T_{CON} = 4$ ms is set. That is, considered is a situation where the touch panel controller 2 supplies the synchronization signal at a frequency of 250 Hz to the stylus pen 15. Further, a clock period $T_{clk}$ of the touch panel controller 2 is set as $T_{clk} = 100$ ns. That is, considered is a situation where the touch panel controller 2 operates at a clock frequency of 10 MHz.

At this time, when the number of clock signals which exist averagely for each time period $T_{CON}$ at which one synchronization signal is supplied from the touch panel controller 2 to the stylus pen 15 is $N_{clk}$, $$N_{clk} = T_{CON}/T_{clk} \quad (7)$$

is represented. $N_{clk}$ is called the ideal number of clocks for a unit below. Here, $N_{clk} = 4$ ms/100 ns = 40000 is provided and 40000 clock signals exist averagely for each time period at which one synchronization signal is supplied from the touch panel controller 2 to the stylus pen 15.

Accordingly, when an ideal number of the clock signal of the touch panel controller 2 at a time point when an N-th synchronization signal is supplied from the touch panel controller 2 to the stylus pen 15 is $N_{clk}[N]$, $$N_{clk}[N] = N_{clk} \times N \quad (8)$$

is represented. $N_{clk}[N]$ is called the ideal number of clocks $N_{clk}[N]$ (the number of controller clocks) below. The ideal number of clocks $N_{clk}[N]$ corresponds to a number of the clock signal generated at the touch panel controller 2, and is provided as $N_{clk}[N] = 40000 \times N$ here.

Subsequently, considered is the stylus pen 15. Here, a number of the clock signal of the stylus pen 15 at a time point when the N-th synchronization signal is supplied from the touch panel controller 2 to the stylus pen 15 is called the number of clocks Data[N] (the number of pen clocks).

At this time, since there is the deviation of the clock period $\Delta T$ between the touch panel controller 2 and the stylus pen 15, the number of clocks Data[N] and the ideal number of clocks $N_{clk}[N]$ are not matched generally. In FIG. 7, a value of the number of clocks Data[N] is shown for each case of (i) $\Delta T \approx 200.02$ ppm=((1+100 ppm)/(1−100 ppm)−1), and
(ii) $\Delta T \approx -199.98$ ppm=((1−100 ppm)/(1+100 ppm)−1).

According to FIG. 7, in the case of $N \geq 1$,
(i) when $\Delta T \approx 200.02$ ppm, Data[N] is represented as $$\text{Data}[N] = \text{CEILING}(40000 \times N / ((1+100 \text{ ppm})/(1-100 \text{ ppm}))) \quad (9)$$

(ii) when $\Delta T \approx -199.98$ ppm, represented as $$\text{Data}[N] = \text{CEILING}(40000 \times N / ((1-100 \text{ ppm})/(1+100 \text{ ppm}))) \quad (10).$$

Here, a function CEILING (x) is a function of outputting a value obtained by rounding up a decimal point of a variable x.

Note that, a case of N=0 corresponds to a reference time at which synchronization is not lost, and $\text{Data}[N] = N_{clk[N]} = 0$ is established.

Next, as a difference between the number of clocks Data[N] and the ideal number of clocks $N_{clk}[N]$, a difference DELTA[N] which is defined by a following formula (11) is considered.

$$\text{DELTA}[N] = \text{Data}[N] - N_{clk}[N] \quad (11)$$

Here, in the case of $N \geq 1$, the DELTA[N] is represented as,
(i) when $\Delta T \approx 200.02$ ppm, $$\text{DELTA}[N] = \text{CEILING}(40000 \times N / ((1+100 \text{ ppm})/(1-100 \text{ ppm}))) - 40000 \times N \quad (12)$$

(ii) when $\Delta T \approx -199.98$ ppm, represented as $$\text{DELTA}[N] = \text{CEILING}(40000 \times N / ((1-100 \text{ ppm})/(1+100 \text{ ppm}))) - 40000 \times N \quad (13).$$

Here, the difference DELTA[N] represents a difference of the number of clock signals between the number of clocks Data[N] and the ideal number of clocks $N_{clk}[N]$.

Note that, because of $\text{Data}[N] = N_{clk}[N] = 0$ in the case of N=0, DELTA[N]=0 is provided.

Here, according to FIG. 7, in a range of $0 \leq N \leq 2499$, DELTA[N]<20000 is provided, that is, DELTA[N]<$N_{clk}/2$ . . . (correction allowance condition) is established.

Here, the difference DELTA[N] represents a difference of the number of clock signals between the number of clocks Data[N] and the ideal number of clocks $N_{clk}[N]$, and when the correction allowance condition is satisfied, it is assured that a value of the difference DELTA[N] is a half of the ideal number of clocks $N_{clk}$ for a unit, that is, a value less than ($N_{clk}/2$).

Here, the correction allowance condition will be described by using FIG. 8. Each of time $t_{CON}(M) = M \times T_{CON}$ at which an M-th synchronization signal is output from the touch panel controller 2, and time $t_{PEN}(M) = M \times T_{PEN}$ assumed by the stylus pen 15 that the M-th synchronization signal is supplied from the touch panel controller 2 is focused now. Note that, a non-negative integer M here indicates a number of a synchronization signal, and is different from the foregoing natural number M indicating the number of signal lines.

As illustrated at (a) in FIG. 8, in an ideal case where the clock period of the stylus pen 15 is equal to the clock period of the touch panel controller 2, because of $T_{CON} = T_{PEN}$, a relation of $$t_{PEN}(M) = t_{CON}(M)$$

is established.

Next, a case of $T_{CON} > T_{PEN}$, that is, a case where the clock period of the stylus pen 15 is shorter than the clock period of the touch panel controller 2 is considered. In this case, as illustrated at (b) in FIG. 8, a relation of $$t_{CON}(M) > t_{PEN}(M)$$

is established.

Here, in order for allowing that the M-th synchronization signal assumed by the stylus pen 15 to be supplied from the touch panel controller 2 is associated on a one-to-one basis with the M-th synchronization signal output from the touch panel controller 2, $$t_{CON}(M-1/2) < t_{PEN}(M),$$

that is, $$(M-1/2) \times T_{CON} < (M) \times T_{PEN} \quad (14)$$

needs to be established.

Further, by modifying the formula (14), $$(M-1/2)/M < T_{PEN}/T_{CON} \quad (15)$$

is obtained.

Subsequently, a case of $T_{CON} < T_{PEN}$, that is, a case where the clock period of the stylus pen 15 is longer than the clock period of the touch panel controller 2 is considered. In this case, as illustrated at (c) in FIG. 8, a relation of $$t_{CON}(M) < t_{PEN}(M)$$

is established.

Here, in order for allowing that the M-th synchronization signal assumed by the stylus pen 15 to be supplied from the touch panel controller 2 is associated on a one-to-one basis with the M-th synchronization signal output from the touch panel controller 2, $$t_{CON}(M+1/2) > t_{PEN}(M),$$

that is, $$(M+1/2) \times T_{CON} > (M) \times T_{PEN} \quad (16)$$

needs to be established.

Further, by modifying the formula (16), $$(M+1/2)/M > T_{PEN}/T_{CON} \quad (17)$$

is obtained.

Accordingly, a condition for allowing that the M-th synchronization signal assumed by the stylus pen 15 to be supplied from the touch panel controller 2 is associated on a one-to-one basis with the M-th synchronization signal output from the touch panel controller 2 is represented as $$(M-1/2)/M < T_{PEN}/T_{CON} \le (M+1/2)/M \quad (18)$$

by combining the formulas (15) and (17). By representing the formula (18) with a relational formula with a data sequence illustrated in FIG. 7, the correction allowance condition is obtained.

Here, under a condition similar to that of the description in FIG. 7, because of $0.998 \le T_{PEN}/T_{CON} \le 1.0002$, a maximum value of M satisfying the formula (18) is M=2499. Accordingly, a condition similar to the correction allowance condition is derived.

When the correction allowance condition is satisfied, the ideal number of clocks $N_{clk}[N]$ in the N-th synchronization signal is able to be associated on a one-to-one basis with the number of clocks Data[N] in the N-th synchronization signal. Therefore, it is possible to correct difference in the clock signals, which is caused between the touch panel controller 2 and the stylus pen 15.

(Method for Correcting Difference in Clock Signals with Effect of Erroneous Detection of Data Being Eliminated)

Assumed in the discussion above is a case where there is no erroneous detection of data of the number of clocks Data[N] and all data of the number of clocks Data[N] has fixed regularity, for example, as shown in the formulas (9) and (10).

On the other hand, in an actual touch panel system, there is a case where a part of data of the number of clocks Data[N] is erroneously detected and the part of the data of the number of clocks Data[N] is obtained as a random number which does not have fixed regularity.

A method for correcting difference in the clock signals, by which effect of erroneous detection of data of the number of clocks Data[N] is able to be eliminated will be described below.

(When there is no Erroneous Detection of Data of the Number of Clocks Data[N])

First, an ideal case where there is no erroneous detection of data of the number of clocks Data[N] will be described by using FIG. 9. FIG. 9 is a view (table) illustrating one example of components of each matrix when there is no erroneous detection of data of the number of clocks Data[N].

In FIG. 9, as the number of clocks Data[N], four pieces of data from Data[0] to Data[3] are illustrated. Note that, a natural number N represents a final number of the data of the number of clocks Data[N], and N=3 here.

Here, exemplified is a case where $N_{clk}$=40000 and $\Delta T$=100 ppm, and 10000 clock cycles of the touch panel controller 2 correspond to 10001 clock cycles of the stylus pen 15. Accordingly, 40000 clock cycles of the touch panel controller 2 correspond to 40004 clock cycles of the stylus pen 15. Therefore, regularity of $$Data[N]=40004 \times N+5000 \quad (19)$$

is established between the number of clocks Data[N] and the data number N.

(Difference Matrix Data_Relative[ij])

Here, with a following formula (20), a difference matrix Data_Relative[ij] as a two-dimensional array is defined by using the number of clocks Data[i] and the number of clocks Data[j] as a one-dimensional array. Natural numbers i and j here are natural numbers satisfying $0 \le i$ and $j \le N$.

$$Data\_Relative[ij]=Data[i]-Data[j] \quad (20)$$

FIG. 9(a) illustrates a value of each component of the difference matrix Data_Relative[ij]. Here, from the formula (20), $$Data\_Relative[ii]=Data[i]-Data[i]=0 \quad (21).$$

That is, the formula (21) assures that values of all diagonal components in the difference matrix Data_Relative[ij] are 0.

Thus, except for a particular case, the diagonal components will not be considered below in the difference matrix Data_Relative[ij] and other matrixes generated based on the difference matrix Data_Relative[ij].

Further, from the formula (20), $$Data\_Relative[ji] = Data[j] - Data[i] \quad (22)$$
$$= -(Data[i] - Data[j])$$
$$= -Data\_Relative[ij].$$

Thus, the difference matrix Data_Relative[ij] is an antisymmetric matrix.

Accordingly, by calculating, with the formula (22), a value of a component of a lower triangular matrix where i>j is satisfied as to the difference matrix Data_Relative[ij], it is possible to obtain values of all components of the difference matrix Data_Relative[ij] without further calculating a value of a component of an upper triangular matrix where i<j.

(Calculation of each Number of Synchronization Signal)

Next, a matrix M2[ij] (auxiliary matrix) is defined by a following formula (23).

$$M2[ij]=\text{round}(Data\_Relative[ij]/N_{clk}) \quad (23)$$

is calculated. Here, a function round (x) is a round function of outputting a value obtained by rounding off a variable x.

FIG. 9(b) illustrates a value of each component of a matrix M2[ij]. The matrix M2[ij] indicates how large difference of a number an i-th synchronization signal has with respect to a j-th synchronization signal. For example, M2[31]=2, which shows that a third synchronization signal has a number two numbers ahead a first synchronization signal. Moreover, M2[13]=-2, which shows that the first synchronization signal has a number two numbers behind the third synchronization signal.

(Calculation of the Ideal Number of Clocks Corresponding to Each Number of Synchronization Signal)

Next, a matrix M3[ij] (auxiliary matrix) is defined by a following formula (24).

$$M3[ij]=M2[ij] \times N_{clk} \quad (24)$$

FIG. 9(c) illustrates a value of each component of a matrix M3[ij]. The matrix M3[ij] indicates how large difference of the ideal number of clocks the i-th synchronization signal has with respect to the j-th synchronization signal. For example, M3[31]=80000, which shows that the ideal number of clocks of the third synchronization signal advances by an amount of 80000 with respect to the first synchronization signal.

(Calculation of Shift Amount of the Number of Clocks of Each Number of Synchronization Signal)

Next, a matrix M4[ij] (auxiliary matrix) is defined by following formula (25).

$$M4[ij]=Data\_Relative[ij]-M3[ij] \quad (25)$$

FIG. 9(d) illustrates a value of each component of a matrix M4[ij]. The matrix M4[ij] indicates what shift amount of the number of the clocks the i-th synchronization signal has with respect to the j-th synchronization signal. For example, M4[31]=8, which shows that the number of clocks of the third synchronization signal advances by an amount of eight with respect to the first synchronization signal.

Note that, the matrix M2[ij], the matrix M3[ij] and the matrix M4[ij] which are defined by the formula (23), the formula (24) and the formula (25) are collectively called auxiliary matrixes.

(Verification Matrix Verify[ij])

Next, a verification matrix Verify[ij] is defined by a following formula (26).

$$\text{Verify}[ij]=M4[ij]/M2[ij] \quad (26)$$

However, since the diagonal components in the matrix M2[ij] (that is, M2[ii]) have a value of zero in the formula (25), calculation is performed by substituting with M2[ii]=1 to prevent division by zero.

FIG. 9(e) illustrates a value of each component of the verification matrix Verify[ij]. Each non-diagonal component of the verification matrix Verify[ij] shows a shift amount of the number of clocks in each one synchronization signal. Here, a case where 40000 clock cycles of the touch panel controller 2 correspond to 40004 clock cycles of the stylus pen 15 is exemplified, so that Verify[ij]=4 in any non-diagonal component.

An absolute value of each component of the verification matrix Verify[ij] is compared to a first threshold T1 which is set according to design specification of the touch panel system 1, and a component of the verification matrix Verify [ij] which satisfies

|Verify[ij]|<T1 . . . (condition for determining a valid data candidate)

is selected as a valid data candidate. Note that, it is set that T1=10 for a value of the first threshold T1 here.

Subsequently, the number of components of the verification matrix Verify[ij], which satisfy the condition for determining a valid data candidate, in an i-th row of the verification matrix Verify[ij], that is, the number of valid data candidates in the i-th row of the verification matrix Verify[ij] is calculated and defined as a valid data number $N_v[i]$ The value of the valid data number $N_v[i]$ is compared to a second threshold T2, which is set according to the design specification of the touch panel system 1, in each i-th row, and data of each component of the verification matrix Verify[ij] is determined as being valid in the i-th row which satisfies N[i]>T2 . . . (condition for determining a valid data candidate). Note that, it is set that T2=N×2/3=3×2/3=2 for a value of the second threshold T2 here.

(Valid Matrix Valid[ij])

Subsequently, considered is a valid matrix Valid[ij] as a matrix from which valid data having no erroneous detection is extracted based on a condition for determining valid data in the verification matrix Verify[ij].

An i-th row which satisfies the condition for determining valid data is selected in the verification matrix Verify[ij], and each component of the valid matrix Valid[ij] is set as $$\text{Valid}[ij]=\text{Verify}[ij](\text{where}, i>j) \quad (27).$$

FIG. 9(f) illustrates a value of each component of the valid matrix Valid[ij]. With the formula (27), the valid matrix Valid[ij] is prescribed as a matrix having a valid component in a lower triangular component. Note that, any value corresponding to an invalid component, such as 0 or 1, may be substituted with respect to a diagonal component of i=j and an upper triangular component of i<j in the valid matrix Valid[ij].

The verification matrix Veirfy[ij] which is generated based on the difference matrix Data_Relative[ij] serving as an antisymmetric matrix is a symmetric matrix whose diagonal components are equal to each other. Therefore, the valid matrix Valid[ij] which is generated based on the verification matrix Verify[ij] is also a symmetric matrix. Accordingly, it is only required to focus on the lower triangular component of the valid matrix Valid[ij] and it is not required to further use the upper triangular component.

Thus, by generating the valid matrix Valid[ij] as a matrix having a valid component in the lower triangular component, it is possible to reduce a capacity of a memory to be mounted in the stylus pen 15. Further, it also becomes possible to reduce operation time for generating the valid matrix Valid[ij].

Moreover, an average value or a middle value of values of each component of the valid matrix Valid[ij] may be calculated to use the calculated average value or the middle value in the touch panel system 1 as data indicating difference in clocks.

By using the average value or the middle value of the values of each component of the valid matrix Valid[ij] as the data indicating shift of clocks, even when minor error is superimposed on a value of a part of the components of the valid matrix Valid[ij], it is possible to suppress deterioration of accuracy of the shift of clocks. Note that, both of the average value and the middle value of each of the components of the valid matrix Valid[ij] are 4 here.

(When there is Erroneous Detection of Data of the Number of Clocks Data[N])

Subsequently, an actual case where there is erroneous detection of data of the number of clocks Data[N] will be described by using FIG. 10. FIG. 10 is a view (table) illustrating one example of components of each matrix when there is erroneous detection of the data of the number of clocks Data[N]. In FIG. 10, as the number of clocks Data [N], six pieces of data from Data[0] to Data[5] are illustrated.

Exemplified here is a case where, among the six pieces of data from Data[0] to Data [5], four pieces of data are obtained as correct data and two pieces of data are obtained as erroneously detected data.

That is, Data[0], Data[1], Data[3] and Data[5] serving as the four pieces of data corresponding to N=0, 1, 3, 5, respectively in the number of clocks Data[N] are correct data having regularity indicated in the formula (19). On the other hand, Data[2] and Data[4] serving as the two pieces of data corresponding to N=2, 4 are erroneously detected data which has no regularity indicated in the formula (19).

FIG. 10(a) illustrates a value of each component of the difference matrix Data_Relative[ij] calculated based on the formula (20). FIGS. 10(b), (c), and (d) illustrate a value of each component of the matrix M2[ij], the matrix M3[ij], and the matrix M4[ij] serving as the auxiliary matrixes calculated based on the formula (23), the formula (24), and the formula (25), respectively.

(Verification Matrix Verify[ij] when There is Erroneous Detection)

FIG. 10(e) illustrates a value of each component of the verification matrix Verify[ij] calculated based on the formula (26). Here, according to FIG. 10(b), since M2[21]= M2[12]=M2[34]=M2[43]=0 in the matrix M2[ij], calculation is performed in the formula (26) by substituting values of the matrix M2[ii] in the components with 1.

Here, based on that the first threshold T1=10, by using the condition for determining a valid data candidate, Verify[20], Verify[40], Verify[21], Verify[41], Verify[02], Verify[12], Verify[32], Verify[52], Verify[23], Verify[43], Verify[04], Verify[14], Verify[34], Verify[54], Verify[25], and Verify [45] are determined as components which does not satisfy the condition for determining a valid data candidate.

Accordingly, each valid data number N[i] in the i-th row of the verification matrix Verify[ij] is defined as $N_v[0]=3$, $N_v[1]=3$, $N_v[2]=1$, $N_v[3]=3$, $N_v[4]=1$, and $N_v[5]=3$.

Further, by setting the value of the second threshold T2 as T2=3 and using the condition for determining valid data, numbers of the i-th row satisfying the condition for determining valid data are determined as i=0, 1, 3 and 5. Accordingly, the i-th rows where i=2, 4 is satisfied are determined as rows not satisfying the condition for determining valid data. Note that, the value of the second threshold T2 is set as 3, which is a maximum integer not exceeding N×2/3=5×2/3=10/3 here.

FIG. 10(f) illustrates a value of each component of the valid matrix Valid[ij] calculated based on the formula (27). In the valid matrix Valid[ij], it is shown that the respective components in the i-th rows, where i=2, 4 is satisfied, corresponding to Data[2] and Data[4], which serve as data erroneously detected, are not given significant values and are not valid data. Note that, both of the average value and the middle value of each of the components of the valid matrix Valid[ij] are 4.

The values of the first threshold T1 and the second threshold T2 are not limited to the values described above, and may be set as other appropriate values according to the specification of the touch panel system 1. By setting the values of the first threshold T1 and the second threshold T2 suitably, it is possible to effectively eliminate erroneously detected data.

(Detailed Configuration of Synchronization Signal Detection Circuit 22)

Figure 11:
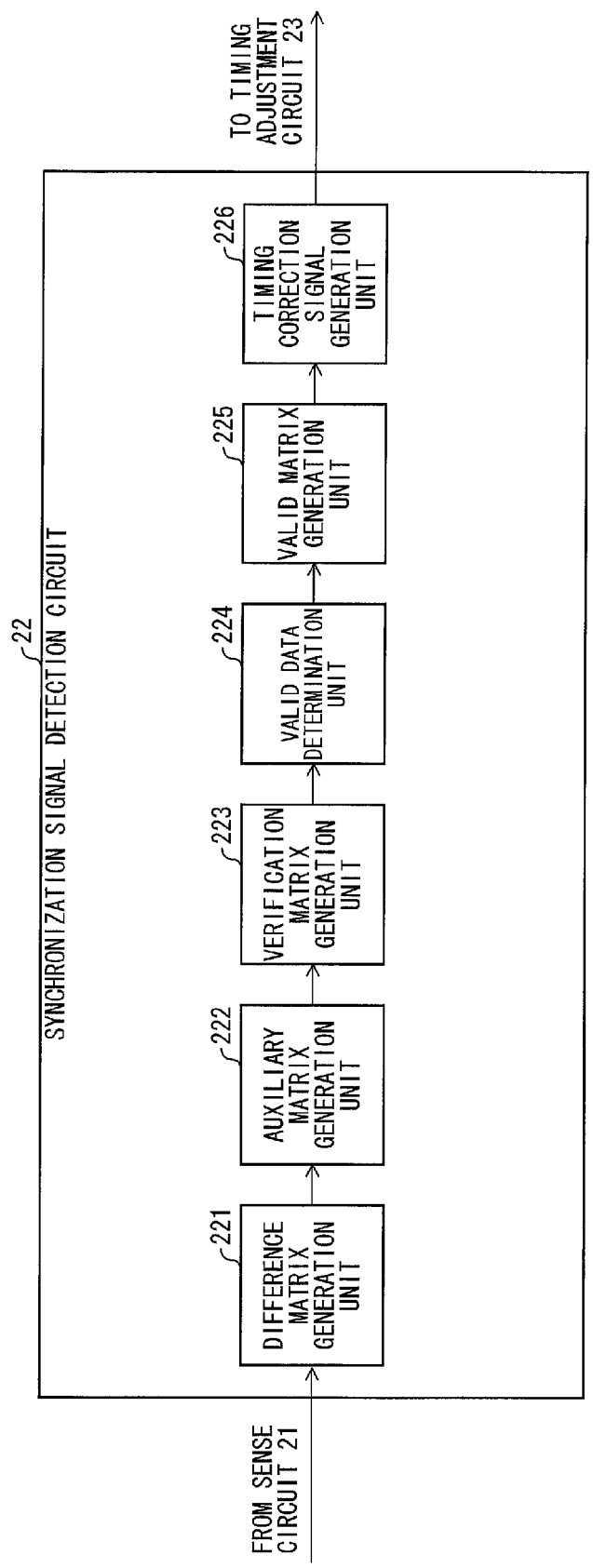
FIG. 11 is a functional block diagram illustrating a detailed configuration of a synchronization signal detection circuit according to the embodiment 1 of the invention.

FIG. 11 illustrates a functional block diagram illustrating a detailed configuration of the synchronization signal detection circuit 22. With FIG. 11, description will be given below for the detailed configuration of the synchronization signal detection circuit 22 which corrects difference in clock signals between the stylus pen 15 and the touch panel controller 2.

The synchronization signal detection circuit 22 includes a difference matrix generation unit 221, an auxiliary matrix generation unit 222, a verification matrix generation unit 223, a valid data determination unit 224, a valid matrix generation unit 225, and a timing correction signal generation unit 226.

The difference matrix generation unit 221 obtains data of the number of clocks Data[N], which indicates a number of the clock signal of the stylus pen 15, from the sense circuit 21. The difference matrix generation unit 221 generates the difference matrix Data_Relative[ij] as a two-dimensional array by using the number of clocks Data[N] as a one-dimensional array based on the formula (20) and supplies the result to the auxiliary matrix generation unit 222.

The difference matrix Data_Relative[ij] is supplied from the difference matrix generation unit 221 to the auxiliary matrix generation unit 222. Further, data of values of the time $T_{CON}$ which is set in initial setting of the stylus pen 15 and of the clock period $T_{clk}$ of the touch panel controller 2 is supplied from the sense circuit 21 to the auxiliary matrix generation unit 222 through the difference matrix generation unit 221.

First, the auxiliary matrix generation unit 222 calculates a value of the ideal number of clocks $N_{clk}$ for a unit by using the formula (7) based on the values of $T_{CON}$ and $T_{clk}$.

Based on the calculated value of the ideal number of clocks $N_{clk}$ for a unit and the difference matrix Data_Relative[ij] received from the difference matrix generation unit 221, the auxiliary matrix generation unit 222 then generates the matrix M2[ij], the matrix M3[ij], and the matrix M4[ij] as the auxiliary matrixes by using the formula (23), the formula (24), and the formula (25), respectively, and supplies the results to the verification matrix generation unit 223.

The verification matrix generation unit 223 generates the verification matrix Verify[ij] by using the formula (26) based on the auxiliary matrixes received from the auxiliary matrix generation unit 222 and supplies the generated result to the valid data determination unit 224.

The verification matrix Verify[ij] is supplied from the verification matrix generation unit 223 to the valid data determination unit 224. Further, data of values of the first threshold T1 and the second threshold T2, which are set in the initial setting of the stylus pen 15, is supplied from the sense circuit 21 to the valid data determination unit 224 through the difference matrix generation unit 221, the auxiliary matrix generation unit 222 and the verification matrix generation unit 223.

The valid data determination unit 224 uses the first threshold T1 to select a component of the verification matrix Verify[ij], which satisfies the condition for determining a valid data candidate, based on the condition for determining a valid data candidate, and defines the valid data number N[i] in the i-th row of the verification matrix Verify[ij].

The valid data determination unit 224 then uses the second threshold T2 to select the i-th row of the verification matrix Verify[ij], which satisfies the condition for determining valid data, based on the condition for determining valid data, and supplies information of a valid data determination result showing a selection result thereof to the valid matrix generation unit 225.

Based on the information of a valid data determination result received from the valid data determination unit 224, the valid matrix generation unit 225 generates the valid matrix Valid[ij] by using the formula (27) and supply the generated result to the timing correction signal generation unit 226.

The timing correction signal generation unit 226 generates a timing correction signal based on a component of the valid matrix Valid[ij], which is received from the valid matrix generation unit 225, and supplies the generated signal to the timing adjustment circuit 23.

Here, the value of each component of the valid matrix Valid[ij] illustrated in FIG. 9(f) and FIG. 10(f) is 4, and the value of each component of the valid matrix Valid[ij] is able to be regarded as information indicating that 40000 clock cycles of the touch panel controller 2 correspond to 40004 clock cycles of the stylus pen 15.

Thus, the valid matrix Valid[ij] reveals that 10000 clock cycles of the touch panel controller 2 correspond to 10001 clock cycles of the stylus pen 15.

Accordingly, the timing correction signal generation unit 226 is able to generate the timing correction signal, for example, so that the operation of the stylus pen 15 is delayed by an amount of 1 clock for each 10000 clocks. This timing correction signal makes it possible to perform correction for each 10000 clocks so that the timing of the clock of the stylus pen 15 is matched with the timing of the clock of the touch panel controller 2, and to suppress loss of synchronization between the stylus pen 15 and the touch panel controller 2.

In addition, the timing correction signal may be generated at the timing correction signal generation unit 226 so that the operation of the stylus pen 15 is delayed by an amount of 0.5 clock for each 5000 clocks. This timing correction signal makes it possible to suppress loss of synchronization between the stylus pen 15 and the touch panel controller 2 more accurately.

Note that, in the timing correction signal generation unit 226, an average value or a middle value of values of each component of the valid matrix Valid[ij] may be calculated and by further using the calculated average value or the middle value, the timing correction signal may be generated.

Embodiment 2

Figure 12:
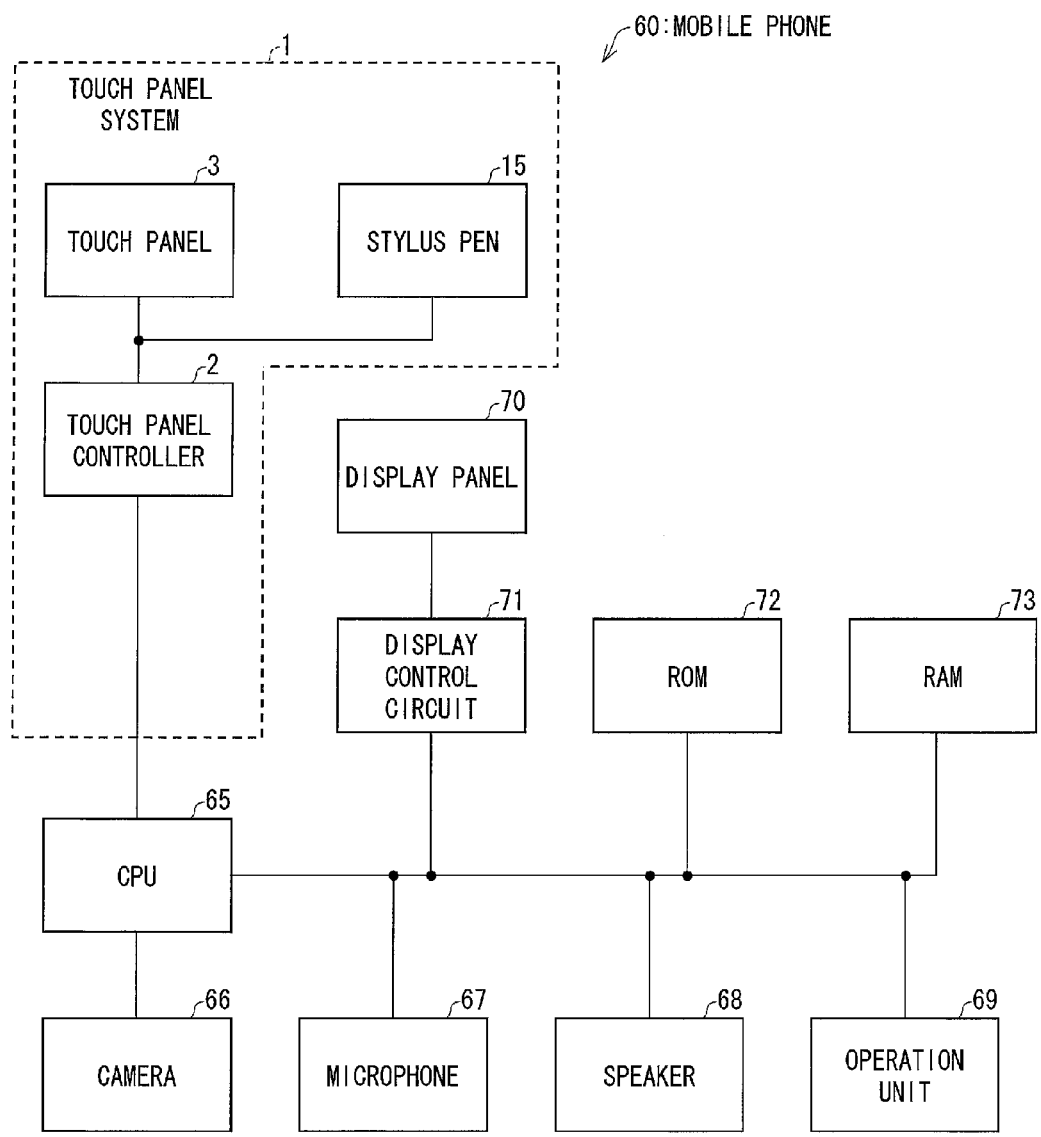
FIG. 12 is a functional block diagram illustrating a configuration of a mobile phone according to an embodiment 2 of the invention.

Another embodiment of the invention will be described based on FIG. 12 as follows. Note that, for convenience of description, members having the same functions as those of the members described in the aforementioned embodiment are given the same reference signs, and description thereof will be omitted. FIG. 12 is a functional block diagram illustrating a configuration of a mobile phone 60 (electronic device) as one example of an electronic device including the touch panel system 1 described in the embodiment 1.

The mobile phone 60 includes a CPU (Central Processing Unit) 65, a camera 66, a microphone 67, a speaker 68, an operation unit 69, a display panel 70, a display control circuit 71, a ROM (Read Only Memory) 72, a RAM (Random Access Memory) 73, and the touch panel system 1.

The respective components included in the mobile phone 60 are connected to each other via a data bus. Note that, though not illustrated in FIG. 12, the mobile phone 60 may be configured to include an interface for connecting with another electronic device by cable.

The CPU 65 controls operation of the mobile phone 60. The CPU 65 executes a program, for example, stored in the ROM 72. The operation unit 69 is an input device which receives input of an instruction by a user of the mobile phone 60, and examples thereof include various operation keys or buttons.

The ROM 72 is a ROM which allows writing and deletion, such as an EPROM (Erasable Programmable ROM) or a flash memory, and stores data in a non-volatile manner. The RAM 73 stores data generated by execution of a program by the CPU 65 or data input through the operation unit 69, in a volatile manner.

The camera 66 photographs an object according to operation of the operation unit 69 by the user. Image data of the object which is photographed is stored in the RAM 73 or an external memory (for example, memory card).

The microphone 67 receives input of voice of the user. The mobile phone 60 digitizes a signal of the voice as analog data, which is input. The mobile phone 60 then transmits the signal of the voice as a digitized signal to a communication target (for example, another mobile phone). The speaker 68 outputs the signal of the voice as the analog signal, for example, based on music data or the like stored in the RAM 73.

The display panel 70 displays an image stored in the ROM 72 or the RAM 73 by the display control circuit 71. The display panel 70 may be overlapped on the touch panel 3 or may incorporate the touch panel 3. Note that, a touch recognition signal indicating a touch position on the touch panel 3, which is generated in the touch recognition unit 10, may have the same role as that of a signal indicating that the operation unit 69 is operated.

The touch panel system 1 has the touch panel controller 2, the touch panel 3, and the stylus pen 15. Operation of the touch panel system 1 is controlled by the CPU 65.

In the present embodiment, the mobile phone 60 as one example of the electronic device including the touch panel system 1 is, for example, a mobile phone or a smartphone, which has a camera, but the electronic device including the touch panel system 1 is not limited thereto. For example, a mobile terminal apparatus such as a tablet, a PC monitor, a signage, an electronic blackboard, and an information processing apparatus such as an information display are also included in the electronic device including the touch panel system 1.

Embodiment 3

A control block (particularly, the CPU 65) of the mobile terminal 60 may be realized by a logic circuit (hardware) formed in an integrated circuit (IC chip) or the like, or may be realized by software by using a CPU.

In the latter case, the mobile phone 60 includes a CPU for executing a command of a program which is software realizing each function, a ROM or a storage apparatus (which is called a "recording medium") in which the aforementioned program and various data are recorded so as to be readable by a computer (or the CPU), and a RAM which develops the aforementioned program. Further, the object of the invention is achieved when the computer (or the CPU) reads the aforementioned program from the aforementioned recording medium for execution. As the aforementioned recording medium, a "non-temporal tangible medium", for example, such as a tape, a disc, a card, a semiconductor memory, or a programmable logic circuit, is usable. The aforementioned program may be supplied to the aforementioned computer through any transmission medium (such as a communication network or broadcast wave) which is able to transmit the program. Note that, the invention may be realized by a mode of a data signal embedded in a carrier wave, in which the aforementioned program is embodied by electronic transmission.

[Overview]

A stylus pen (15) according to an aspect 1 of the invention is a stylus pen that performs touch input to a touch panel (3), including a correction circuit (20) that corrects difference between the number of controller clocks (an ideal number of clocks $N_{clk}[M]$) generated by a touch panel controller (2), which controls operation of the touch panel, for outputting a synchronization signal by the touch panel controller and the number of pen clocks (a number of clocks Data[M]) generated by the stylus pen for receiving, by the stylus pen, the synchronization signal output from the touch panel controller.

With the aforementioned configuration, the correction circuit that corrects difference between the number of controller clocks generated by the touch panel controller, which controls operation of the touch panel, for outputting the synchronization signal by the touch panel controller and the number of pen clocks generated by the stylus pen for receiving, by the stylus pen, the synchronization signal output from the touch panel controller is included in the stylus pen that performs touch input to the touch panel.

Accordingly, with the correction circuit, difference between the number of controller clocks and the number of pen clocks is able to be corrected.

Therefore, it becomes possible for the stylus pen to perform various operation associated with touch input to the touch panel while being in synchronization with the touch panel controller with high accuracy.

It is preferable for the stylus pen according to an aspect 2 of the invention that, in the aforementioned aspect 1, the number of pen clocks is represented by the number of pen clocks Data[M] (the number of clocks Data[M]) indicating a clock number of the stylus pen at a time point when an M-th (M is a non-negative integer) synchronization signal supplied from the touch panel controller is output from the touch panel controller and the number of pen clocks Data[N] (the number of clocks Data[N]) indicating a clock number of the stylus pen at a time point when an N-th (N is a non-negative integer) synchronization signal supplied from the touch panel controller is output from the touch panel controller, the correction circuit includes a sense circuit (21) that detects the numbers of pen clocks Data[M] and Data[N], and a synchronization signal detection circuit (22) that generates a timing correction signal as a control signal for causing the stylus pen to operate in synchronization with the touch panel controller based on the numbers of pen clocks Data[M] and Data[N] detected by the sense circuit, and the synchronization signal detection circuit includes a difference matrix generation unit (221) that uses the numbers of pen clocks Data[M] and Data[N] to generate, by operation of Data_Relative[MN]=Data[M]−Data[N]  ($0 \leq M \leq K$ and $0 \leq N \leq K$, where K is an integer), a difference matrix Data_Relative[MN] that represents difference between the numbers of pen clocks Data[M] and Data[N] as a two-dimensional data array, an auxiliary matrix generation unit (222) that uses a value of a time period ($T_{CON}$) at which the synchronization signal is output from the touch panel controller and a value of a clock period ($T_{clk}$) of the touch panel controller, which are known parameters in the stylus pen, to generate a plurality of types of auxiliary matrixes (M2[MN], M3[MN] and M4[MN]) based on the difference matrix Data_Relative[MN], a verification matrix generation unit (223) that generates a verification matrix Verify[MN] for verifying whether or not values of the numbers of pen clocks Data[M] and Data[N] are valid based on the plurality of types of auxiliary matrixes, a valid data determination unit (224) that determines whether or not a value of each component of the verification matrix Verify [MN] is valid, a valid matrix generation unit (225) that generates a valid matrix Valid[MN] by extracting a value of each component of the verification matrix Verify[MN], which is determined as being valid in the valid data determination unit, and a timing correction signal generation unit (226) that generates the timing correction signal by using the value of each component of the valid matrix Valid[MN].

With the aforementioned configuration, the number of pen clocks is represented by the number of pen clocks Data[M] and the number of pen clocks Data[N] indicating clock numbers of the stylus pen at a time point when each of the M-th and the N-th (M and N are non-negative integers) synchronization signals supplied from the touch panel controller is output from the touch panel controller.

The correction circuit includes the sense circuit that detects the numbers of pen clocks Data [M] and Data[N]. Moreover, the correction circuit includes the synchronization signal detection circuit that generates the timing correction signal as the control signal for causing the stylus pen to operate in synchronization with the touch panel controller based on the numbers of pen clocks Data[M] and Data[N] detected by the sense circuit.

The synchronization signal detection circuit further includes the difference matrix generation unit, the auxiliary matrix generation unit, the verification matrix generation unit, the valid data determination unit, the valid matrix generation unit, and the timing correction signal generation unit.

The difference matrix generation unit uses the numbers of pen clocks Data[M] and Data[N] to generate, by operation of Data_Relative[MN]=Data[M]−Data[N]  ($0 \leq M \leq K$ and $0 \leq N \leq K$, where K is an integer), the difference matrix Data_Relative[MN] that represents difference between the numbers of pen clocks Data[M] and Data[N] as a two-dimensional data array by using the formula (20), which is illustrated in the embodiment 1.

The auxiliary matrix generation unit uses the value of the time period $T_{CON}$ at which the synchronization signal is output from the touch panel controller and the value of the clock period $T_{clk}$ of the touch panel controller, which are known parameters in the stylus pen, to generate the plurality of types of auxiliary matrixes based on the difference matrix Data_Relative[MN]. As one example of the auxiliary matrixes, for example, the matrix M2[MN], the matrix M3[MN], and the matrix M[MN] generated by using the formula (7), the formula (23), the formula (24) and the formula (25), which are illustrated in the embodiment 1, may be exemplified.

The verification matrix generation unit generates the verification matrix Verify[MN] for verifying whether or not the values of the numbers of pen clocks Data[M] and Data[N] are valid based on the plurality of types of auxiliary matrixes. The verification matrix Verify[MN] is generated based on the plurality of types of auxiliary matrixes, for example, by using the formula (26) illustrated in the embodiment 1.

The valid data determination unit determines whether or not the value of each component of the verification matrix Verify[MN] is valid. The valid matrix generation unit generates the valid matrix Valid[MN] by extracting the value of each component of the verification matrix Verify[MN], which is determined as being valid in the valid data determination unit.

The timing correction signal generation unit generates the timing correction signal by using the value of each component of the valid matrix Valid[MN].

Accordingly, the stylus pen is able to generate the timing correction signal by eliminating effect of the values of the numbers of pen clocks Data[M] and Data[N], which are determined as being invalid.

Therefore, even when a part of the number of pen clocks Data[M] indicating the pen clock number of the stylus pen, which corresponds to the M-th synchronization signal output from the touch panel controller, is erroneously detected in the stylus pen, it is possible to prevent the timing correction signal from being affected by the number of pen clocks Data[M] which is erroneously detected.

Thus, it becomes possible for the stylus pen to perform various operation associated with touch input to the touch panel while being in synchronization with the touch panel controller with high accuracy.

Moreover, it is preferable for the stylus pen according to an aspect 3 of the invention that, in the aforementioned aspect 2, the valid data determination unit, when an absolute value of a component of the verification matrix Verify[MN] is less than a first threshold (T1), selects the component of the verification matrix Verify[MN] as a valid data candidate, and calculates the number of valid data candidates in each row (i) of the verification matrix Verify[MN] as a valid data number in the row ($N_v[i]$), and when the valid data number exceeds a second threshold (T2), determines that a value of each component of the verification matrix Verify[MN] in the row is valid.

With the aforementioned configuration, when the absolute value of the component of the verification matrix Verify[MN] is less than the first threshold T1, the valid data determination unit selects the component of the verification matrix Verify[MN] as the valid data candidate. That is, the valid data determination unit selects the component of the verification matrix Verify[MN], which satisfies the condition for determining a valid data candidate illustrated in the embodiment 1, as the valid data candidate.

The valid data determination unit then calculates the number of valid data candidates in each row i of the verification matrix Verify[MN] as the valid data number in the row $N_v[i]$.

Subsequently, when the valid data number N[i] exceeds the second threshold T2, the valid data determination unit determines that the value of each component of the verification matrix Verify[MN] in the row is valid. That is, the valid data determination unit determines that the value of the component of the verification matrix Verify[MN], which satisfies the condition for determining valid data illustrated in the embodiment 1, is valid.

Accordingly, by suitably selecting each of the first threshold T1 and the second threshold T2 according to values of various parameters as operation specification of the stylus pen, such as the time period $T_{CON}$ at which a synchronization signal is output from the touch panel controller and the clock period $T_{clk}$ of the touch panel controller, it is possible to eliminate the effect of the erroneously detected number of pen clocks Data[M] on the timing correction signal more effectively.

Moreover, it is preferable for the stylus pen according to an aspect 4 of the invention that, in the aforementioned aspect 2 or 3, the timing correction signal generation unit generates the timing correction signal by using an average value or a middle value of values of each component of the valid matrix Valid[MN].

With the aforementioned configuration, the timing correction signal generation unit generates the timing correction signal by using the average value or the middle value of the values of each component of the valid matrix Valid[MN].

Accordingly, even when error which is minor in a level of being unable to be eliminated by the first threshold Ti nor the second threshold T2 is superimposed on the value of a part of the components of the valid matrix Valid[ij], it is possible to prevent the timing correction signal from being affected by a value of a part of components of a valid matrix Valid[ij], in which the minor error is caused.

Moreover, it is preferable for the stylus pen according to an aspect 5 of the invention that, in any one of the aforementioned aspects 2 to 4, the valid matrix generation unit generates the valid matrix Valid[MN] by extracting a value of each component belonging to lower triangular components of the verification matrix Verify[MN], which is determined as being valid in the valid data determination unit.

With the aforementioned configuration, the valid matrix generation unit generates the valid matrix Valid[MN] by extracting the value of each component belonging to the lower triangular components of the verification matrix Verify[MN], which is determined as being valid in the valid data determination unit.

Here, since the difference matrix Data_Relative[MN] which is generated by using the formula (20) illustrated in the embodiment 1 is an antisymmetric matrix, the verification matrix Verify[MN] which is generated based on the difference matrix Data_Relative[MN] becomes a symmetric matrix.

Therefore, the valid matrix Valid[MN] which is generated based on the verification matrix Verify[MN] also becomes a symmetric matrix.

Accordingly, when the timing correction signal is generated, only lower triangular components of the valid matrix Valid[ij] may be used and upper triangular components of the valid matrix Valid[ij] do not need to be used.

Thus, by forming the valid matrix Valid[ij] as a matrix having a valid component in the lower triangular components, it is possible to reduce a capacity of a memory to be mounted in the stylus pen. It also becomes possible to reduce operation time in the valid matrix generation unit.

Moreover, it is preferable that a touch panel system (1) according to an aspect 6 of the invention includes the stylus pen according to any one of the aforementioned aspects 1 to 5, a touch panel to which touch input is performed by the stylus pen, and a touch panel controller that detects a position at which the touch input to the touch panel is performed by the stylus pen.

Moreover, it is preferable that an electronic device (mobile phone 60) according to an aspect 7 of the invention includes the touch panel system according to the aforementioned aspect 6.

Moreover, the electronic device according to the aforementioned aspect 7 may be realized by a computer in aspects 8 and 9 of the invention, and in such a case, a control program of the electronic device which realizes the electronic device in the computer by causing the computer to operate as each unit included in the electronic device, and a computer readable recording medium having it recorded therein are also incorporated in a range of the invention.

[Additional Matter]

The invention is not limited to each of the embodiments described above, and may be modified in various manners within the scope of the claims and an embodiment achieved by appropriately combining technical means disclosed in each of different embodiments is also encompassed in the technical scope of the invention. Further, by combining the technical means disclosed in each of the embodiments, a new technical feature may be formed.

INDUSTRIAL APPLICABILITY

The invention is able to be used for a stylus pen, and a touch panel system and an electronic device that include the stylus pen.

REFERENCE SIGNS LIST 1 touch panel system
2 touch panel controller
3 touch panel
15 stylus pen
20 correction circuit
21 sense circuit
22 synchronization signal detection circuit
60 mobile phone (electronic device)
221 difference matrix generation unit
222 auxiliary matrix generation unit
223 verification matrix generation unit
225 valid data determination unit
225 valid matrix generation unit
226 timing correction signal generation unit
M, N non-negative integer (number of synchronization signal)
Data[N] the number of clocks (the number of pen clocks)

$N_{clk}[N]$ the ideal number of clocks (the number of controller clocks)
Data_Relative[MN] difference matrix
M2[MN], M3[MN], M4[MN] matrix (auxiliary matrix)
Verify[MN] verification matrix
Valid[MN] valid matrix
$T_{CON}$ time period of synchronization signal output from touch panel controller
$T_{clk}$ clock period of touch panel controller
T1 first threshold
T2 second threshold
i row number
N[i] valid data number

The invention claimed is:

1. A stylus pen that performs touch input to a touch panel, comprising:
a correction circuit that corrects difference between the number of controller clocks generated by a touch panel controller, which controls operation of the touch panel, for outputting a synchronization signal by the touch panel controller and the number of pen clocks generated by the stylus pen for receiving, by the stylus pen, the synchronization signal output from the touch panel controller, wherein
the number of pen clocks is represented by the number of pen clocks Data[M] indicating a clock number of the stylus pen at a time point when an M-th synchronization signal supplied from the touch panel controller is output from the touch panel controller and the number of pen clocks Data[N] indicating a clock number of the stylus pen at a time point when an N-th synchronization signal supplied from the touch panel controller is output from the touch panel controller, where M and N are non-negative integers,
the correction circuit includes
a sense circuit that detects the numbers of pen clocks Data[M] and Data[N], and
a synchronization signal detection circuit that generates a timing correction signal as a control signal for causing the stylus pen to operate in synchronization with the touch panel controller based on the numbers of pen clocks Data[M] and Data[N] detected by the sense circuit, and
the synchronization signal detection circuit includes
a difference matrix generation unit that uses the numbers of pen clocks Data[M] and Data[N] to generate, by operation of
Data_Relative[MN]=Data[M]−Data[N] (0≤M≤K and 0≤N≤K, where K is an integer),
a difference matrix Data_Relative[MN] that represents difference between the numbers of pen clocks Data[M] and Data[N] as a two-dimensional data array,
an auxiliary matrix generation unit that uses a value during a time period at which a synchronization signal is output from the touch panel controller and a value of a clock period of the touch panel controller, which are known parameters in the stylus pen, to generate a plurality of types of auxiliary matrixes based on the difference matrix Data_Relative[MN],
a verification matrix generation unit that generates a verification matrix Verify[MN] for verifying whether or not values of the numbers of pen clocks Data[M] and Data[N] are valid based on the plurality of types of auxiliary matrixes,
a valid data determination unit that determines whether or not a value of each component of the verification matrix Verify[MN] is valid,
a valid matrix generation unit that generates a valid matrix Valid[MN] by extracting a value of each component of the verification matrix Verify[MN], which is determined as being valid in the valid data determination unit, and
a timing correction signal generation unit that generates the timing correction signal by using the value of each component of the valid matrix Valid[MN].

2. The stylus pen according to claim 1, wherein
the valid data determination unit,
when an absolute value of a component of the verification matrix Verify[MN] is less than a first threshold, selects the component of the verification matrix Verify[MN] as a valid data candidate, and
calculates the number of valid data candidates in each row of the verification matrix Verify[MN] as a valid data number in the row, and
when the valid data number exceeds a second threshold, determines that a value of each component of the verification matrix Verify[MN] in the row is valid.

3. A touch panel system, comprising
a stylus pen;
a touch panel to which touch input by the stylus pen is performed; and
a touch panel controller that detects a position at which the touch input to the touch panel is performed by the stylus pen, wherein
the stylus pen includes
a correction circuit that corrects difference between the number of controller clocks generated by a touch panel controller, which controls operation of the touch panel, for outputting a synchronization signal by the touch panel controller and the number of pen clocks generated by the stylus pen for receiving, by the stylus pen, the synchronization signal output from the touch panel controller, wherein
the number of pen clocks is represented by the number of pen clocks Data[M] indicating a clock number of the stylus pen at a time point when an M-th synchronization signal supplied from the touch panel controller is output from the touch panel controller and the number of pen clocks Data[N] indicating a clock number of the stylus pen at a time point when an N-th synchronization signal supplied from the touch panel controller is output from the touch panel controller, where M and N are non-negative integers,
the correction circuit includes
a sense circuit that detects the numbers of pen clocks Data[M] and Data[N], and
a synchronization signal detection circuit that generates a timing correction signal as a control signal for causing the stylus pen to operate in synchronization with the touch panel controller based on the numbers of pen clocks Data[M] and Data[N] detected by the sense circuit, and
the synchronization signal detection circuit includes
a difference matrix generation unit that uses the numbers of pen clocks Data[M] and Data[N] to generate, by operation of
Data_Relative[MN]=Data[M]−Data[N] (0≤M≤K and 0≤N≤K, where K is an integer),
a difference matrix Data_Relative[MN] that represents difference between the numbers of pen clocks Data[M] and Data[N] as a two-dimensional data array,
an auxiliary matrix generation unit that uses a value during a time period at which a synchronization signal is output from the touch panel controller and a value of a clock period of the touch panel controller, which are known parameters in the stylus pen, to generate a plurality of types of auxiliary matrixes based on the difference matrix Data_Relative[MN], a verification matrix generation unit that generates a verification matrix Verify[MN] for verifying whether or not values of the numbers of pen clocks Data[M] and Data[N] are valid based on the plurality of types of auxiliary matrixes, a valid data determination unit that determines whether or not a value of each component of the verification matrix Verify[MN] is valid, a valid matrix generation unit that generates a valid matrix Valid[MN] by extracting a value of each component of the verification matrix Verify[MN], which is determined as being valid in the valid data determination unit, and a timing correction signal generation unit that generates the timing correction signal by using the value of each component of the valid matrix Valid[MN].

4. An electronic device including the touch panel system according to claim 3.

\* \* \* \* \*